(12) United States Patent
Jia et al.

(10) Patent No.: US 8,923,661 B2
(45) Date of Patent: Dec. 30, 2014

(54) 2-PATTERN COMPOUND PHOTONIC CRYSTALS WITH A LARGE, COMPLETE PHOTONIC BAND GAP

(75) Inventors: Lin Jia, Cambridge, MA (US); Edwin Lorimer Thomas, Houston, TX (US)

(73) Assignee: Massachusetts Institute of Technology, Cambridge, MA (US)

( * ) Notice: Subject to any disclaimer, the term of this patent is extended or adjusted under 35 U.S.C. 154(b) by 173 days.

(21) Appl. No.: 13/524,455

(22) Filed: Jun. 15, 2012

(65) Prior Publication Data

US 2013/0028553 A1    Jan. 31, 2013

Related U.S. Application Data

(60) Provisional application No. 61/512,038, filed on Jul. 27, 2011.

(51) Int. Cl.
*G02B 6/00* (2006.01)
*G02B 6/122* (2006.01)

(52) U.S. Cl.
CPC .................................. *G02B 6/1225* (2013.01)
USPC .......................................................... 385/11

(58) Field of Classification Search
None
See application file for complete search history.

(56) References Cited

U.S. PATENT DOCUMENTS

| | | | | |
|---|---|---|---|---|
| 2002/0041749 | A1* | 4/2002 | Johnson et al. | 385/129 |
| 2003/0223721 | A1* | 12/2003 | Povinelli et al. | 385/129 |
| 2004/0091224 | A1 | 5/2004 | Baumberg | |
| 2005/0053321 | A1* | 3/2005 | Lidorikis et al. | 385/15 |
| 2008/0124037 | A1* | 5/2008 | Noda et al. | 385/129 |
| 2009/0212265 | A1 | 8/2009 | Steinhardt | |
| 2009/0263094 | A1* | 10/2009 | Noda et al. | 385/129 |
| 2009/0269005 | A1* | 10/2009 | Sigalas et al. | 385/16 |
| 2010/0104250 | A1* | 4/2010 | Noda et al. | 385/129 |
| 2012/0138864 | A1* | 6/2012 | Steinhardt et al. | 252/500 |

FOREIGN PATENT DOCUMENTS

KR    1020030085668 A    11/2003
WO       2011005530 A2     1/2011

OTHER PUBLICATIONS

L. Jia, and E. L. Thomas, "Two-pattern compound photonic crystals with a large complete photonic band gap," Physical Review A 64, 033810 (2011).
L. Jia, and E. L. Thomas, "Theoretical study on photonic devices based on a communsurate two-pattern photonic crystal," Optics Letters 36, 3416-6418 (2011).
Y. Akahane, T. Asano, B. S. Song, and S. Noda, "High-Q photonic nanocavity in a two-dimensional photonic crystal," Nature 425, 944-947 (2003).
S. Noda, M. Fujita, and T. Asano, "Spontaneous-emission control by photonic crystals and nanocavities," Nature Photonics 1, 449-458 (2007).

(Continued)

*Primary Examiner* — Sung Pak
(74) *Attorney, Agent, or Firm* — Sam Pasternack; MIT Technology Licensing Office

(57) ABSTRACT

2-pattern photonic crystal and the associated photonic devices are described here. A 2-pattern photonic crystal has a large, complete photonic band gap. It includes a TM sub-structure providing a large TM photonic band gap superimposed on a TE sub-structure providing a large TE photonic band gap. The resulting 2-pattern photonic crystals have complete photonic band gaps larger than 15%. By altering the respective sub-structures, optical devices for different polarizations (TE, TM or both) can be readily designed, and those optical devices can be integrated on the same plane.

20 Claims, 22 Drawing Sheets

(56) References Cited

OTHER PUBLICATIONS

Y. A. Vlasov, M. O'Boyle, H. F. Hamann, and S. J. McNab, "Active control of slow light on a chip with photonic crystal waveguides," Nature 438, 65-69 (2005).

M. Belotti, J.F. Galisteo-Lopez, S. De Angelis, M. Galli, I. Maksymov, L. C. Andreani, D. Peyrade, and Y. Chen, "All-optical switching in 2D silicon photonic crystals with low loss waveguides and optical cavities," Optics Express 16, 11624-11636 (2008).

R. S. Jacobesen, K. N. Andersen, P. I. Borel, J. Fage-Pedersen, L. H. Frandsen, O. Hansen, M. Kristensen, A. V. Lavrinenko, G. Moulin, H. Ou, C. Peucheret, B. Zsigri, and A. Bjarklev, "Strained silicon as a new electric-optic material," Nature 441, 199-202 (2006).

D. Englund, D. Fattal, E. Waks, G. Solomon, B. Zhang, T. Nakaoka, Y. Arakawa, Y. Yamamoto, and J. Vuckovic, "Controlling the spontaneous emission rate of single quantum dots in a two-dimensional photonic crystal," Physical Review Lettersn 95 (2005).

M. Fujita, S. Takahashi, Y. Tanaka, T. Asano, and S. Noda, "Simultaneous inhibition and redistribution of spontaneous light emission in photonic crystals," Science 306, 1296-1298 (2005).

Y. Tanaka, J. Upham, T. Nagashima, T. Sugiya, T. Asano, and S. Noda, "Dynamic control of the Q factor in a photonic crystal nanocavity," Nature Materials 6, 862-865 (2007).

J. S. Foresi, P. R. Villeneuve, J. Ferrera, E. R. Thoen, G. Steinmeyer, S. Fan, J. D. Joannopoulos, L. C. Kimerling, H. I. Smith, and E. P. Ippen, "Photonic-bandgap microavities in opitcal waveguides," Nature 390, 143-145 (1997).

E. Chow, S. Y. Lin, S. G. Johnson, P. R. Villeneuve, J. D. Joannopoulos, J. R. Wendt, G. A. Vawter, W. Zubrzycki, H. Hou, and A. Alleman, "Three-dimensional control of light in a two-dimensional photonic crystal slab," Nature 407, 983-986 (2000).

T. F. Krauss, R. M. Delarue, and S. Brand, "Two-dimensional photonic-bandgap structures operating at near infrared wavelengths," Nature 383, 699-702 (1996).

Y. Tanaka, T. Asano, Y. Akahane, B. S. Song, and S. Noda, "Theoretical investigation of a two-dimensional photonic crystal slab with truncated cone air holes," Applied Physics Letters 82, 1661-1663 (2003).

H. Matsubara, S. Yoshimoto, H. Saito, J. L. Yue, Y. Tanaka, and S. Noda, "GaN photonic-crystal surface-emiting laser at blue-violet wavelengths," Science 319, 445-447 (2008).

O. Painter, R. K. Lee, A. Scherer, A. Yariv, J. D. O'Brien, P. D. Dapkus, and I. Kim, "Two-dimensional photonic band-gap defect mode laser," Science 284, 1819-1821 (1999).

H. G. Park, S. H. Kim, S. H. Kwon, Y. G. Ju, J. K. Yang, J. H. Baek, S. B. Kim, and Y. H. Lee, "Electrically driven single-cell photonic crystal laser," Science 305, 1444-1447 (2004).

K. Ishihara, M. Fujita, I. Matsubara, T. Asano, S. Noda, H. Ohata, A. Hirasawa, H. Nakada, and N. Shimoji, "Organic light-emitting diodes with photonic crystals on glass substrate fabricated by nanoimprint lithography," Applied Physics Letters 90 (2007).

M. Fujita, T. Ueno, K. Ishihara, T. Asano, S. Noda, H. Ohata, T. Tsuji, H. Nakada, and N. Shimoji, "Reduction of operating voltage in organic light-emitting diode by corrugated photonic crystal structre," Applied Physics Letters 85, 6769-5771 (2004).

M. Fujitam, T. Ueno, T. Asano, S. Noda, H. Ohhata, T. Tsuji, H. Nakada, and N. Shimoji. "Organic light-emitting diode with ITO/organic photonic crystal," Electronics Letters 39, 1750-1752 (2003).

M. Fujita, K. Ishihara, T. Ueno, T. Asano, S. Noda, H. Ohata, T. Tsuji, H. Nakada, and N. Shimoji, "Optical and electrical charactersitcs of organic light-emitting diodes with two-dimensional photonic crystals in organic/electrode layers," Japanese Journal of Applied Physics Part 1-Regular Papers Short Notes & Review Papers 44, 3669-3677 (2005).

A. Chutinan, K. Ishihara, T. Asano, M. Fujita, and S. Noda, "Theoretical analysis on light-extraction efficiency of orgranic light-emitting diodes using FDTD and mode-expansion methods," Organic Electronics 6, 3-9 (2005).

S. Noda, A. Chutinan, and M. Imada, "Trapping and emission of photons by a single defect in a photonic bandgap structure," Nature 407, 608-610 (2000).

J. Limpert, A. Liem, M. Reich, T. Schreiber, S. Nolte, H. Zellmer, A. Tunnermann, J. Broeng, A. Petersson, and C. Jakobsen,"Low-nonlinearity single-transverse-mode ytterbium-doped photonic crystal fiber amplifier," Opitcs Express 12, 1313-1319 (2004).

T. T. Larsen, A. Bjarklev, D. S. Hermann, and J. Broeng, "Optical devices based on liquid crystal photonic bandgap fibres," Optics Express 11, 2589-2596 (2003).

L. Jia, I. Bita, and E. L. Thomas, "Impact of Geometry on the TM Photonic Crystals and Quasicrystals," Physical Review Letters 107 (2011).

L. Jia, I. Bita, and E. L. Thomas, "Photonic density of states of two-dimensional quasicrystailine photonic structures," Physical Review A 84 (2011).

M. C. Rechtsman, H. C. Jeong, P. M. Chaikin, S. Torquato, and P. J. Steinhardt, "Optimized structures for photonic quasicrystals," Physical Review Letters 101 (2008).

O. Sigmund, and K. Hougaard, "Geometric properties of the optimal photonic cyrstals," Physical Review Letters 100 (2008).

M. Florescu, S. Torquato, and P. J. Steinhardt, "Designer disordered materials with large, complete photonic band gaps," Proceedings of the National Academy of Sciences of the United States of America 106, 20658-20663 (2009).

S. Y. Chou, P. R. Krauss, and P. J. Renstrom, "Nanoimprint lithography," Journal of Vacuum Science & Technology B 14, 4129-4133 (1996).

Y. N. Xia, J. A. Rogers, K. E. Paul, and G. M. Whitesides, "Unconventional methods for fabricating and patterning nanostructures," Chemical Reviews 99, 1823-1848 (1999).

International Preliminary Report on Patentability PCT/US2012/042902 mailed on Feb. 6, 2014.

\* cited by examiner

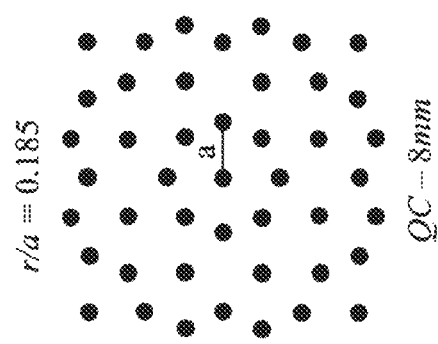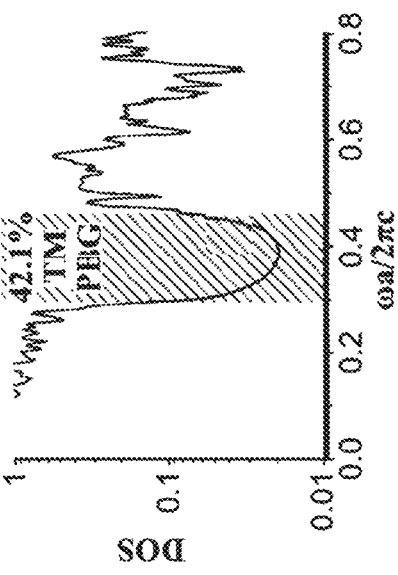
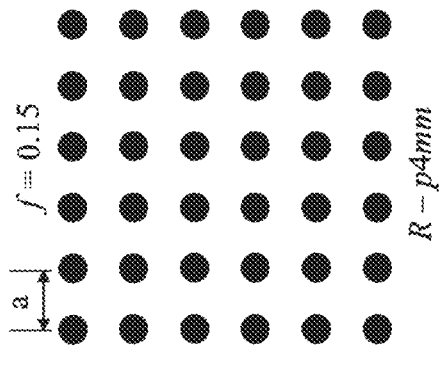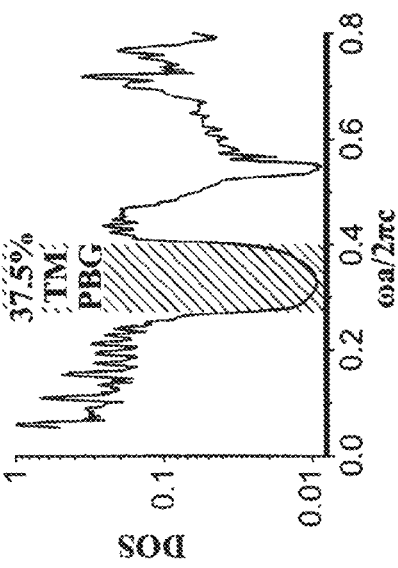
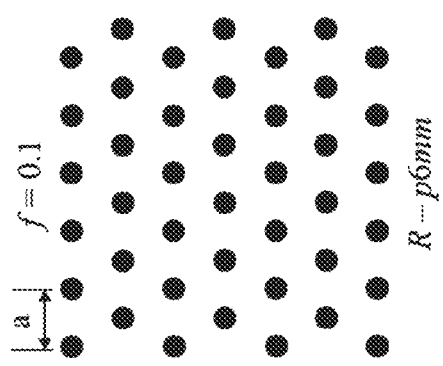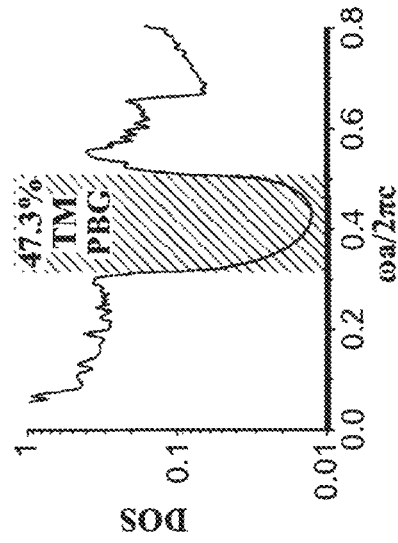
FIG. 1a   FIG. 1b   FIG. 1c

2-PATTERN COMPOUND PHOTONIC CRYSTALS WITH A LARGE, COMPLETE PHOTONIC BAND GAP

This application claims priority to provisional application No. 61/512,038 filed Jul. 27, 2011, the contents of which, are incorporated herein by reference in their entirety.

This invention was made with government support under Grant No. W911NF-07-D-0004, awarded by the Army Research Office. The government has certain rights in this invention.

BACKGROUND OF THE INVENTION

This invention relates to photonic band gap materials and more particularly to 2-pattern photonic crystals that have a large, complete photonic band gap (PBG) [1, 2]. Numbers in brackets refer to the list of references included herewith. The contents of these references are incorporated herein by reference.

Two-dimensional (2D) photonic crystal devices have wide applications in slow light devices [3-5], optical chip components [6, 7], spontaneous emission control devices [8, 9], quantum information devices [10], waveguides [11-14], lasers [15-17], light emitting diodes [18-22] and optical communications [23-25]. For the above applications, the optical wave is classified to two modes according to its polarization: transverse electronic (TE) and transverse magnetic (TM). To date, one of the challenges for photonics is that there is no general method to integrate multiple optical wave control devices for different polarizations onto the same plane at the scale of the wavelength. To solve this problem, we invented a novel set of PBG structures with large, complete PBG and an approach to design on chip devices. The PBG structures, called 2-pattern photonic crystals, do not belong to any know photonic crystal category and have the largest complete PBG reported so far. They come from the superposition of two sub-photonic crystals: one contributes the TM PGB and the other contributes the TE PBG. We demonstrate the unique advantages of the 2-pattern crystals to efficiently and freely mold both TM and TE waves for polarization specific waveguides, crossed waveguide, a wavelength scale polarizer, and a high quality resonator for both polarizations. The 2-pattern photonic crystal and the associated device design are general liable and intuitive. They have the potential to be standard tools for future optical chip devices.

SUMMARY OF THE INVENTION

The 2-pattern photonic crystal with a large, complete PBG according to the invention includes a TM sub-structure having discrete dielectric features providing a large TM PBG superimposed on a TE sub-structure having expanded dielectric features providing a large TE PBG. The sub-structures may be periodic or aperiodic. In a preferred embodiment, the TM sub-structure comprises rods on a triangular lattice. In yet another embodiment, the TM sub-structure comprises an eight-fold quasicrystal of dielectric rods. The TE sub-structure may be a connected honeycomb structure or circular rings on a triangular lattice. A suitable material for the sub-structures is GaAs or silicon.

It is preferred that the sub-structures include defects suited to optical devices of particular polarizations. Because the TM/TE PBGs of the 2-pattern photonic crystals each arise from one of the two patterns, by purposely introducing defects into the sub-structures, photonic devices for different polarizations can be integrated. They can bend, split, couple, and filter TM/TE waves simultaneously on the scale of wavelength. Those devices can be used for general wave molding purposes (wave-guiding, resonator, integrated circuit, filtering, etc).

In a particularly preferred embodiment, features are removed from the TE sub-structure without modifying the TM sub-structure to create a waveguide for propagating TE waves and stopping propagation of TM waves. In another embodiment, features are removed from the TM sub-structure without modifying the TE sub-structure to create a waveguide for propagating TM waves and stopping propagation of TE waves. Integrated optical circuits, such as a wavelength-scale polarizer, a crossed waveguide, and a high-Q resonator, are also demonstrated here.

BRIEF DESCRIPTION OF THE DRAWINGS

FIG. 4b is PBG calculation showing the small impact on complete PBG of relative positions of the sub-structures in FIG. 4a.

FIG. 5b is PBG calculation showing the small impact on complete PBG of relative orientation of the sub-structures in FIG. 5a.

FIG. 7b is a graph illustrating the PBG calculation of the structure of FIG. 7a.

FIG. 9b is an illustration of TE wave light intensity distribution in the waveguide of FIG. 9a.

FIG. 9c is an illustration of TM wave light intensity distribution in the waveguide of FIG. 9a.

FIG. 10b is an illustration of TE wave light intensity distribution in the structure of FIG. 10a FIG. 10c is an illustration of TM wave light intensity distribution in the structure of FIG. 10a.

DESCRIPTION OF THE PREFERRED EMBODIMENT

In our approach, we create a superior 2-pattern photonic crystal by combining a TM sub-structure having discrete dielectric features that provide a large TM PBG with a TE sub-structure having expanded dielectric features chosen to provide a large TE PBG. The sub-structures can be periodic or aperiodic. Our concept is based on the rationale that the TE sub-structure of the 2-pattern photonic crystal can be assumed to be a type of geometrical perturbation to the TM sub-structure and vice versa. If the TE sub-structure filling ratio is not high, the ordered geometrical perturbation does not strongly modify the TM PBG of the 2-pattern photonic crystal. Further, the small or zero TM PBG of the TE sub-structure brings trivial impact on the TM PBG of the 2-pattern photonic crystal which arises predominately from the TM sub-structure. The reverse situation holds for the TE PBG of the 2-pattern photonic crystal arising predominately from the TE sub-structure. One 2-pattern photonic crystal is comprised of two superposed patterns, while previously reported photonic crystals are based on a single pattern. The TE and TM PBGs of 2-pattern photonic crystals are much less interdependent than the PBGs of conventional photonic crystals. Importantly, by selectively creating defects in the different sub-structures, we can design photonic devices for particular polarizations (TM, TE, or both) and integrate them together.

To analyze the PBG, we calculate the normalized density of states (DOS) via finite-difference time-domain (FDTD) [26, 27]. We assign a radiating dipole near the middle of a large portion of the structure and provide a perfectly matched layer (PML) on the boundaries. Four hundred detectors are distributed near the boundary of the simulated area to collect the transmission spectra, which represents the DOS. The calculation results are tested for different radiating dipole positions and radiating sources of a group of random distributed dipoles.

Figure 1E:
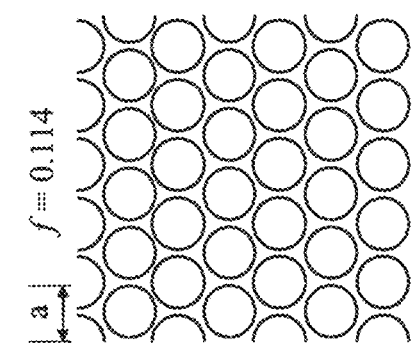
FIGS. 1a, b, c are schematic illustrations of sub-structures having large TM PBG along with the corresponding PBG's calculations shown below the sub-structures, FIGS. 1d, e are schematic illustrations of sub-structures having large TE PBG along with the corresponding PBG's calculations shown below the sub-structures.
Figure 1D:
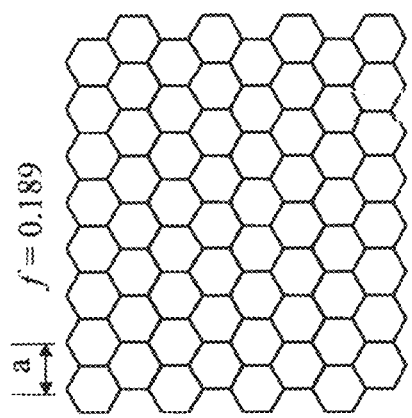

In 2D, the following factors define the 2-pattern photonic crystal: the morphology, the filling ratios, and the relative scale, position and orientation of the sub-structures. The first design factor is the morphology of the sub-structures. Here it is desirable to select one structure with a large TE PBG but trivial TM PBG and another structure with a large TM PBG but trivial TE PBG. Throughout, we assume that the dielectric material is GaAs with a permittivity of 11.4. We pick three candidates for the TM PBG sub-structure: rods on a triangular lattice (R-p6mm), (see FIG. 1a, the current champion structure with the largest 47.3% TM PBG [28], and no TE PBG for 0.1 filling ratio), rods on a square lattice (R-p4mm) (see FIG. 1b, 37.5% TM PBG and no TE PBG for 0.15 filling ratio), and an eight-fold quasicrystal of dielectric rods generated from hyperspace projection (QC-8mm) (see FIG. 1c, 42.1% TM PBG and no TE PBG for ~0.1 filling fraction with r/a=0.185, here r is the radius of the rods and a is the quasicrystalline length parameter). The two candidates for the TE PBG sub-structure both have p6mm symmetry: the connected honeycomb structure (HC-p6mm) (see FIG. 1d, the current champion TE gap structure with the largest 42.5% TE PBG [29], and no TM PBG for 0.189 filling ratio) and circular rings on a triangular lattice (CR-p6mm) (see FIG. 1e, 23.4% TE PBG and TM PBG less than 10% for 0.11 filling ratio).

Figure 2A:
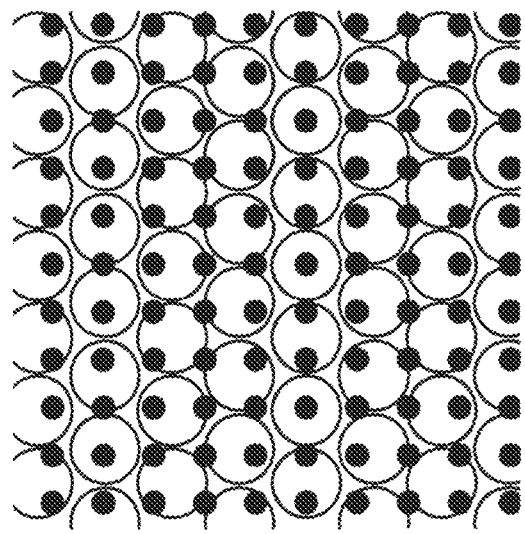
FIG. 2a is a schematic illustration of a 2-pattern photonic crystal made from R-p4mm plus CR-p6mm sub-structures.
Figure 2B:
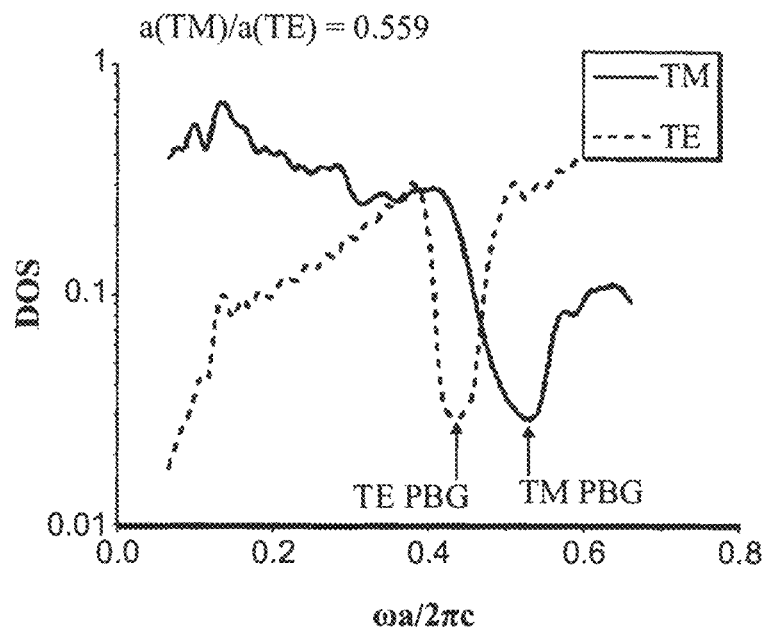
FIG. 2b is a plot of PBG calculated via density of states (DOS) for a(TM)/a(TE)=0.559.
Figure 2C:
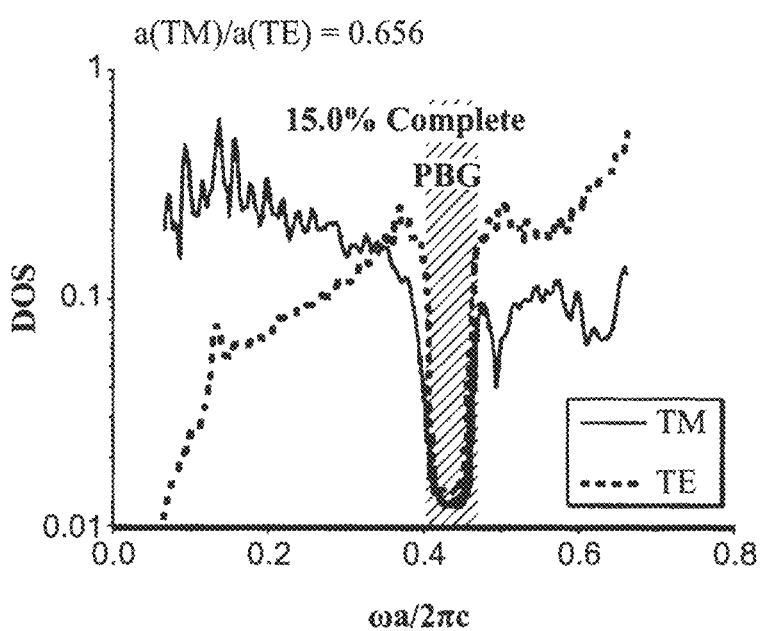
FIG. 2c is a plot of PBG calculated via DOS for a(TM)/a(TE)=0.656.

The second design factor is the relative length scale of the two sub-structures. If we tune the scale of the TE(TM) sub-structure, the position of the TE (TM) PBG is shifted accordingly. The central frequency of the TE (TM) PBG is proportional to 1/a, here a is the characteristic scale of the sub-structure [30]. For the TM sub-structure consisting of rods, the TM gap mainly comes from Mie resonance. As we increase the scale of the sub-structure, the radius of the rods increases, which leads to a lower Mie resonance frequency and lower central gap frequency. An example is shown in FIG. 2a, made from the superposition of the R-p4mm and CR-p6mm structures depicted in FIG. 1b and FIG. 1e. The filling ratio of the TE sub-structure is 0.102 and the filling ratio of the TM sub-structure is 0.149. The DOS plot for a(TM)/a(TE)=0.559 is shown in FIG. 2b. Note that the TE-PBG and the TM-PBG barely overlap. To maximize the complete PBG, we increase the periodicity of the TM sub-structure to decrease the central frequency of the TM-PBG. The tuning is continued until the TE-PBG and the TM-PBG fully overlap, which is shown in FIG. 2c, leading to a complete PBG of 15%.

Figure 3B:
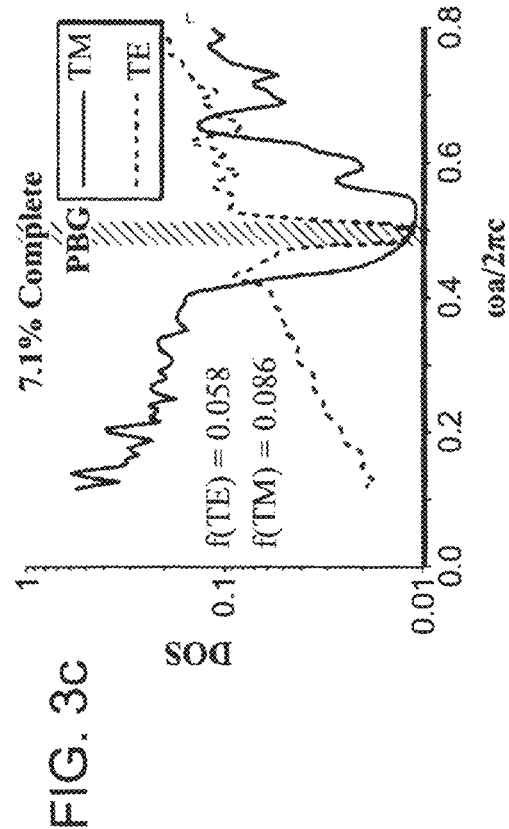
FIG. 3b is a plot of TE PBG and TM PBG of a 2-pattern photonic crystal for different filling ratios of the TE sub-structure.
Figure 3C:
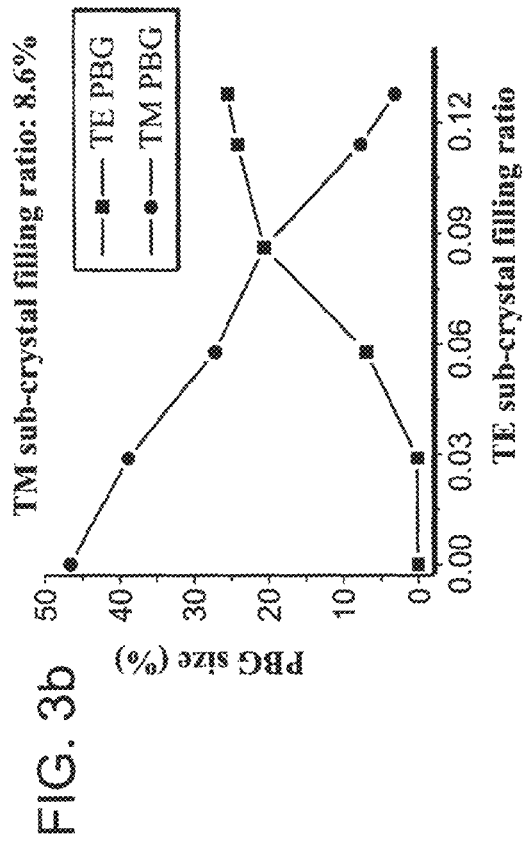
FIG. 3c is PBG calculation for a TE sub-structure filling ratio of f(TE)=0.058.
Figure 3A:
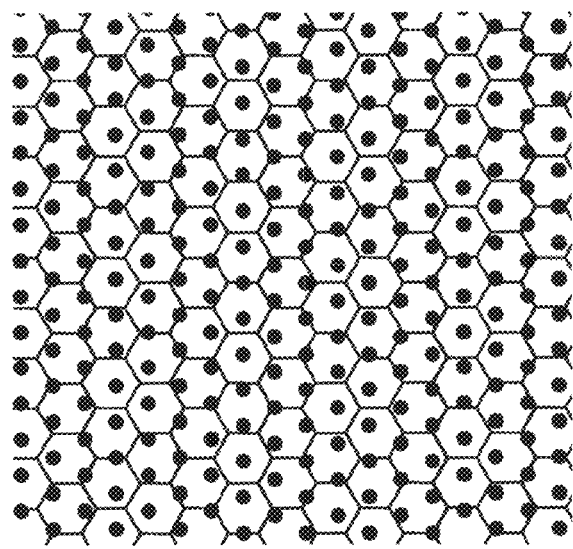
FIG. 3a is a schematic illustration of a 2-pattern photonic crystal made from the superposition of the R-p6mm plus HC-p6mm.
Figure 3D:
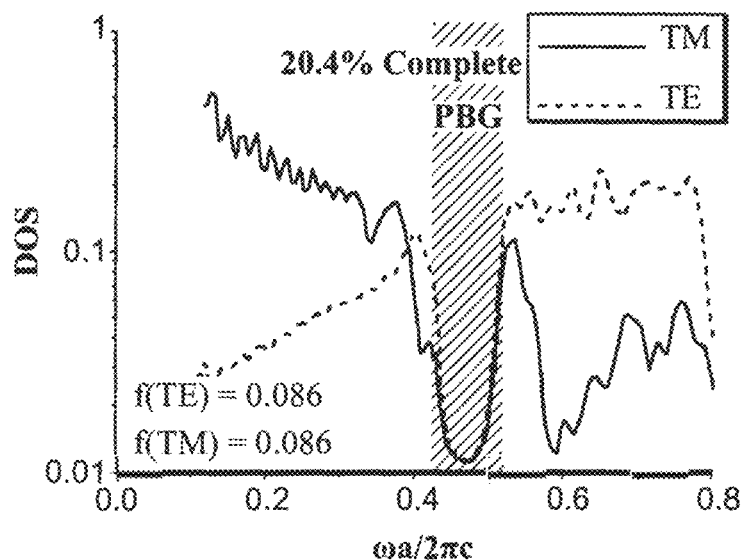
FIG. 3d is PBG calculation for f(TE)=0.086.
Figure 3E:
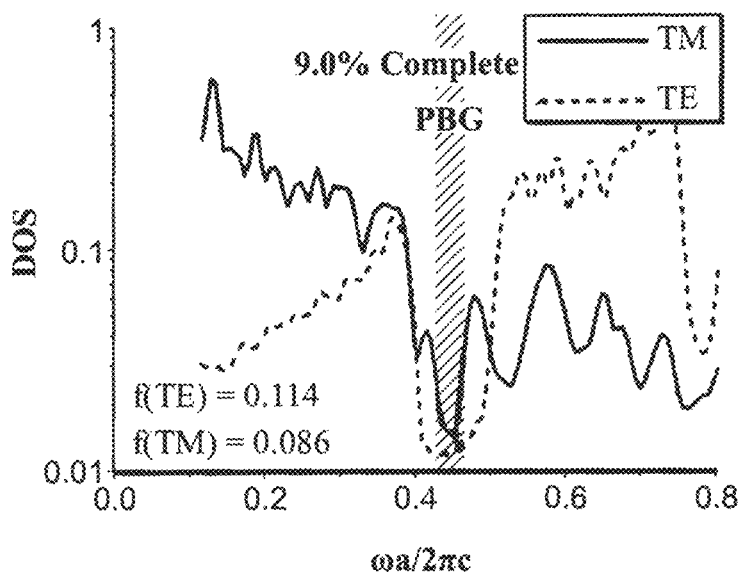
FIG. 3e is PBG calculation for f(TE)=0.114.

The third design factor is the individual sub-structure filling ratio. The filling ratio of each type of sub-structure controls the respective TE or TM gap but also modifies the strength of the ordered geometrical perturbation on the PBG of the other sub-structure. Therefore, altering the TE sub-structure can in general shrink the size of the TM PBG and the shrinkage will increase with the filling ratio of TE sub-structure while the reverse situation holds for varying the filling ratio of the TM sub-structure. The above effect has also been observed in a disordered system [31]. An example of the effect of filling ratio on the band gap is evident from the superposition of the R-p6mm and HC-p6mm crystals shown in FIG. 3a. In FIG. 3b, we fix the filling ratio of the TM sub-structure to 8.6% and increase the filling ratio of TE sub-structure. If the filling ratio of the TE sub-structure is too high (above 14%), the TM PBG is destroyed and the complete PBG closes. If the filling ratio of the TE sub-structure is too low (below 3%), the TE PBG of the 2-pattern photonic crystal is low or even closes, which is also obviously disadvantageous. Therefore, the filling ratios of the sub-structures need to be adjusted carefully to maximize the complete PBG. In FIG. 3c, the TE-PBG is smaller than TM-PBG and the complete PBG size is determined by the TE-PBG. To maximize the complete PBG, it is necessary to increase the TE-PBG size. Therefore we increase the filling ratio of the TE sub-structure. Although the TM-PBG shrinks because of this tuning, as shown in FIG. 3b, the complete PBG size increases. We increase the filling ratio until the TE-PBG and TM-PBG match, which is shown in FIG. 3d. The complete PBG is maximized because if the filling ratio of the TE sub-structure increases further, as shown in FIG. 3e, the TM-PBG is smaller than the TE-PBG and the complete PBG is determined by the TM-PBG, which is relatively smaller than the complete PBG in FIG. 3d.

Figure 4A:
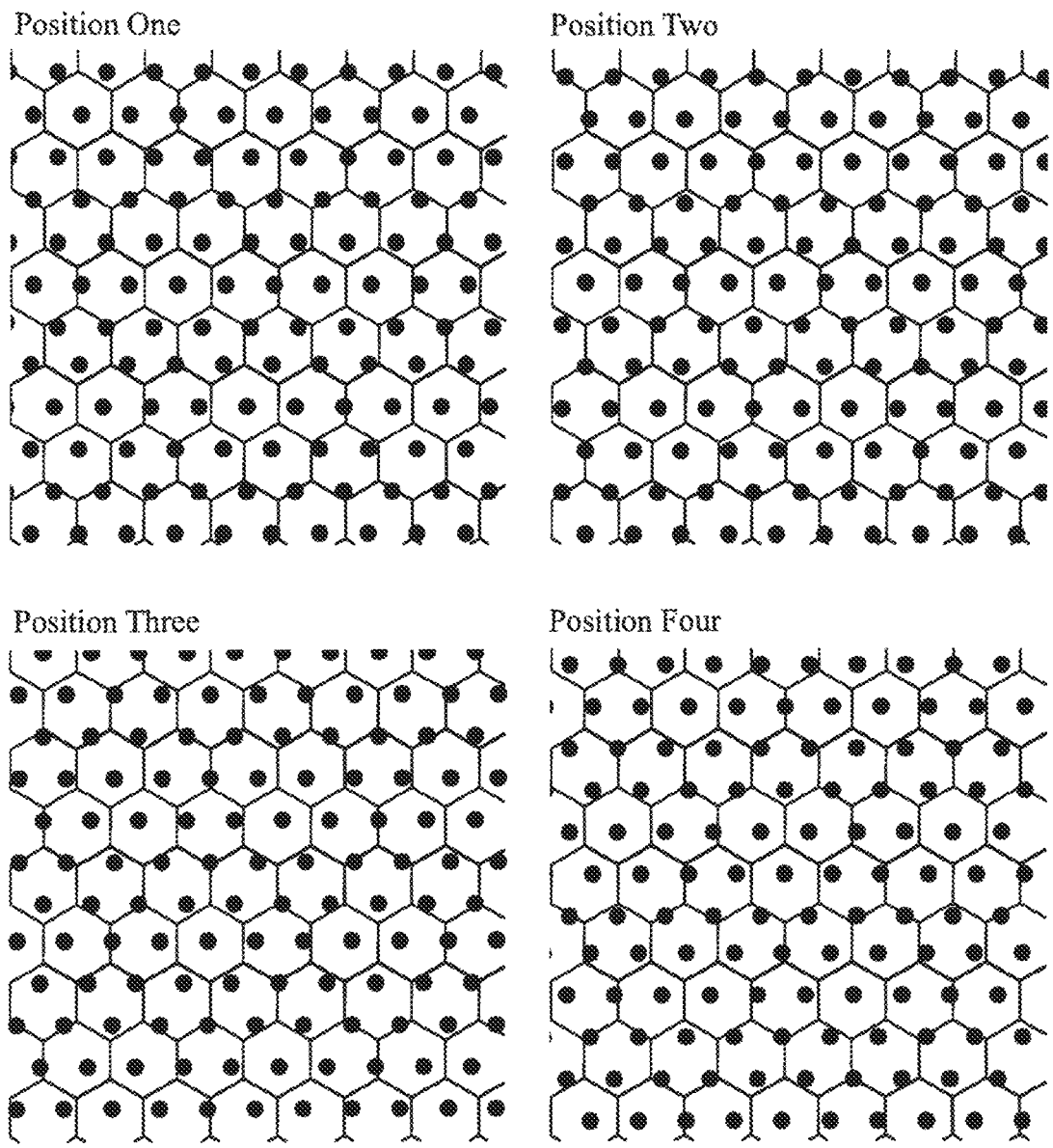
FIG. 4a is a schematic illustration of four 2-pattern photonic crystals corresponding to different relative positions of the sub-structures.
Figure 4B:
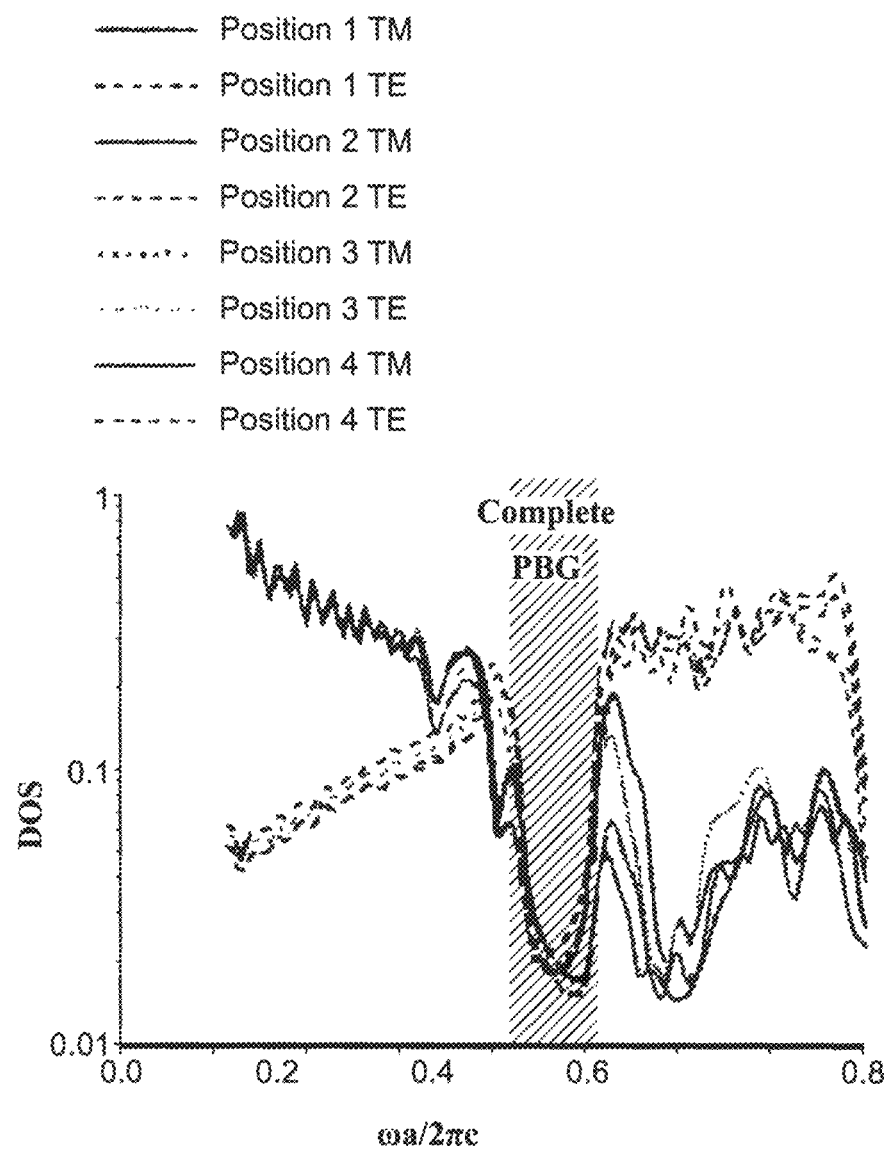
Figure 5A:
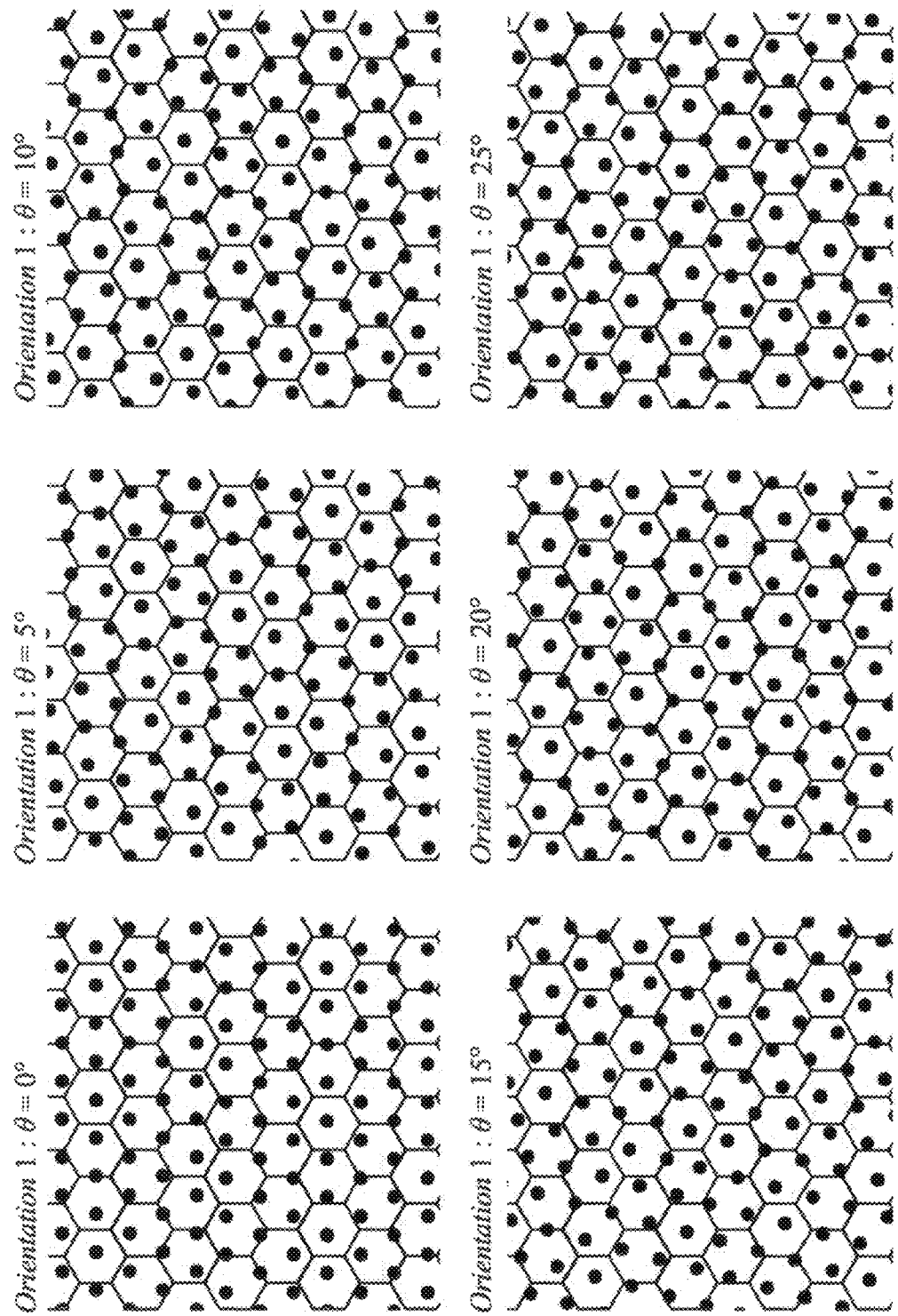
FIG. 5a is a schematic illustration of six 2-pattern photonic crystals corresponding to different relative orientations of the sub-structures.
Figure 5B:
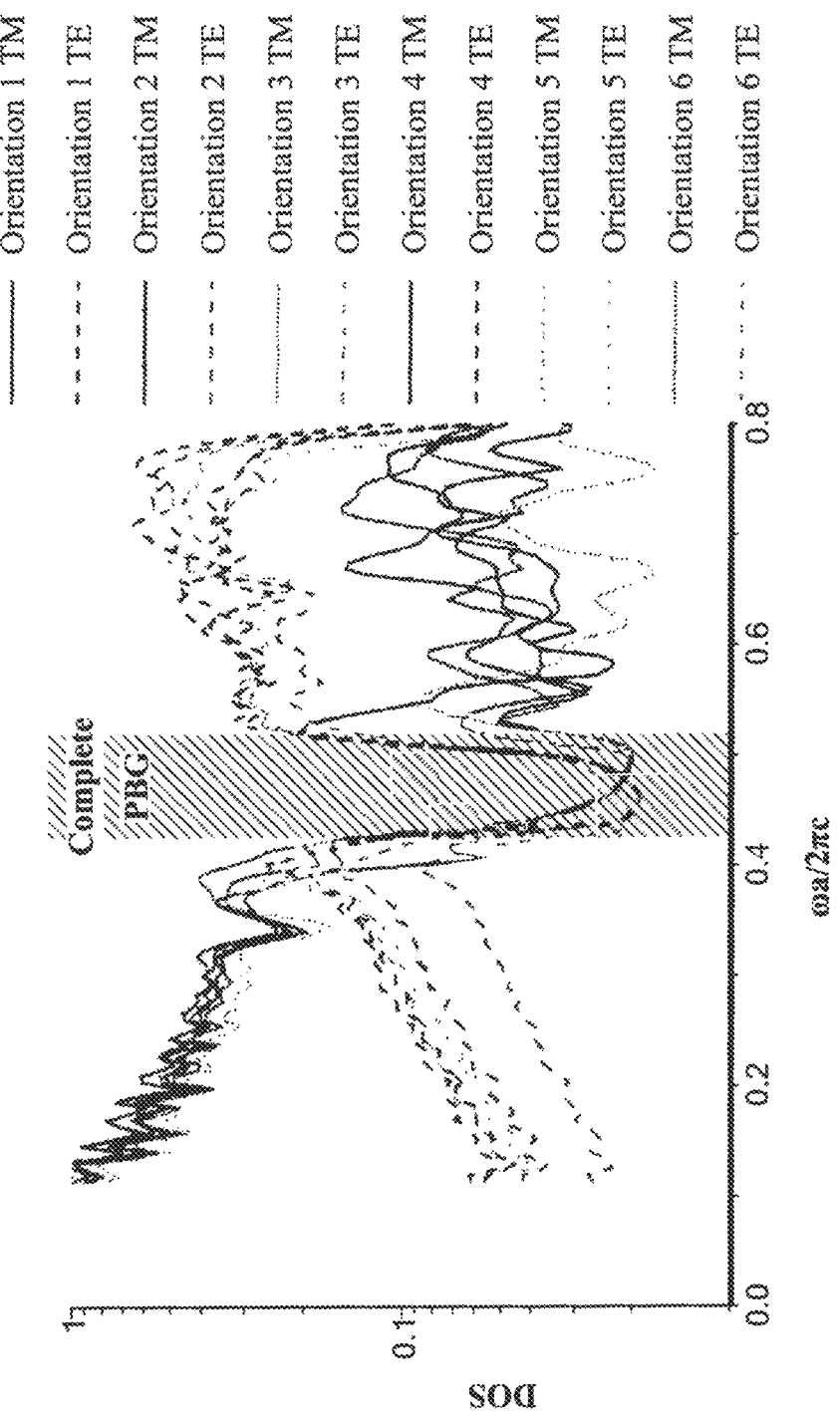

The fourth and the fifth design factors are the relative position and orientation of the sub-structures. Interestingly, it turns out these factors have essentially no influence on the PBG since the changes in the relative location of the TE pattern, as an ordered geometrical perturbation to TM pattern, should not substantially vary the TM PBG of the 2-pattern photonic crystal with the same reasoning for the behavior of the TE PBG by the presence of the TM pattern. Therefore, the relative position and orientation of the TE/TM sub-structures only bring minor impact on the complete PBG, as confirmed in FIG. 4 and FIG. 5. The above fact is advantageous for the fabrication of the 2-pattern photonic crystals because it is not necessary to precisely adjust the relative position/orientation of the two patterns.

Figure 6A:
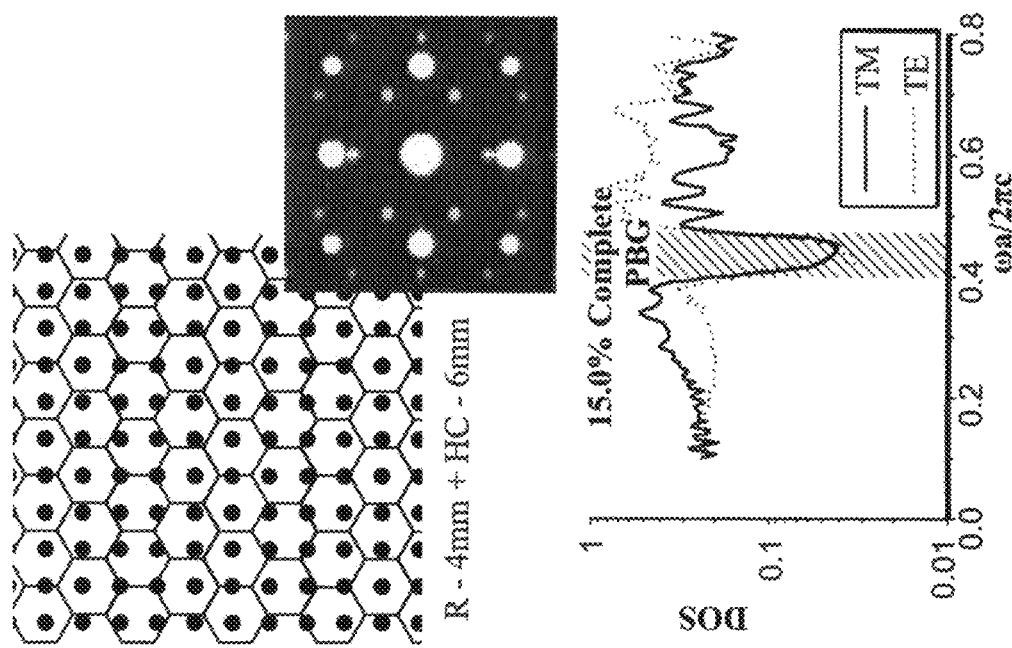
FIG. 6a is a schematic illustration of a champion structure based on the R-p6mm plus HC-p6mm sub-structures with the filling ratio of the TE sub-structure: f(TE)=0.086, the filling ratio of the TM sub-structure: f(TM)=0.086, and the periodicity ratio of the TM/TE sub-structures: a(TM)/a(TE)=0.7157. The discrete Fourier transform (DFT) calculation of the 2-pattern photonic crystal and corresponding PBG calculation are shown below.
Figure 6B:
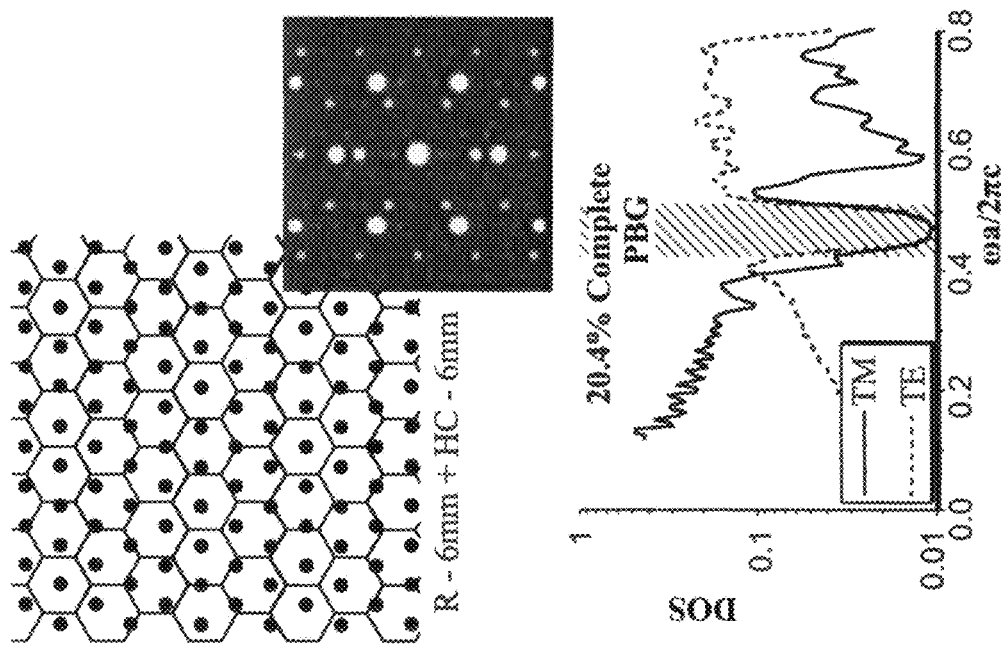
FIG. 6b is a schematic illustration of a 2-pattern photonic crystal from the R-p4mm plus HC-p6mm sub-structure with f(TE)=0.08, f(TM)=0.14 and a(TM)/a(TE)=0.67.
Figure 6D:
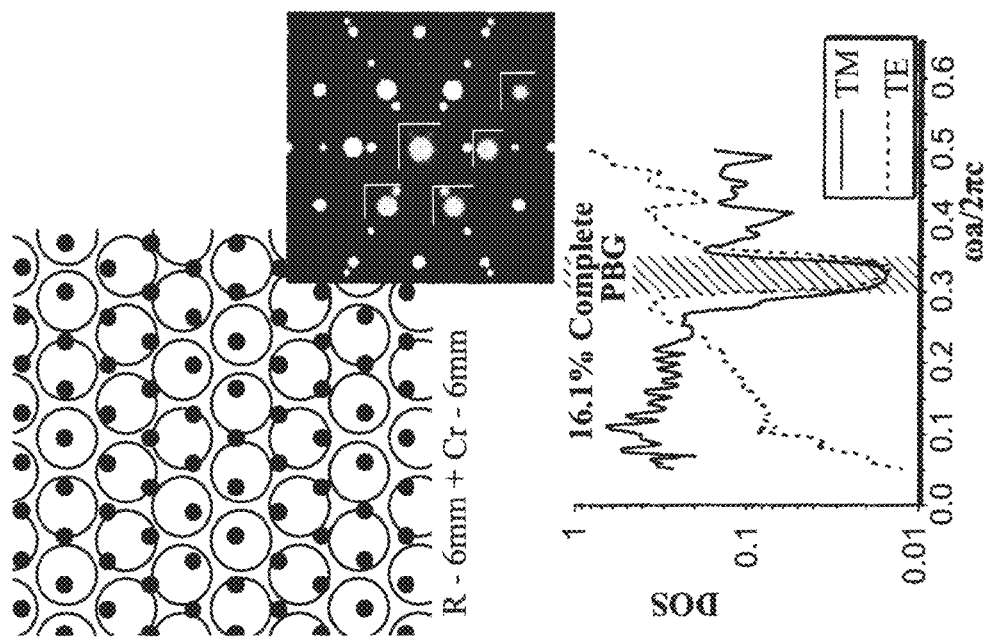
FIG. 6d is a schematic illustration of a 2-pattern photonic crystal from the R-6mm plus CR-p6mm sub-structures with f(TE)=0.121, f(TM)=0.102 and a(TM)/a(TE)=0.7258.
Figure 6C:
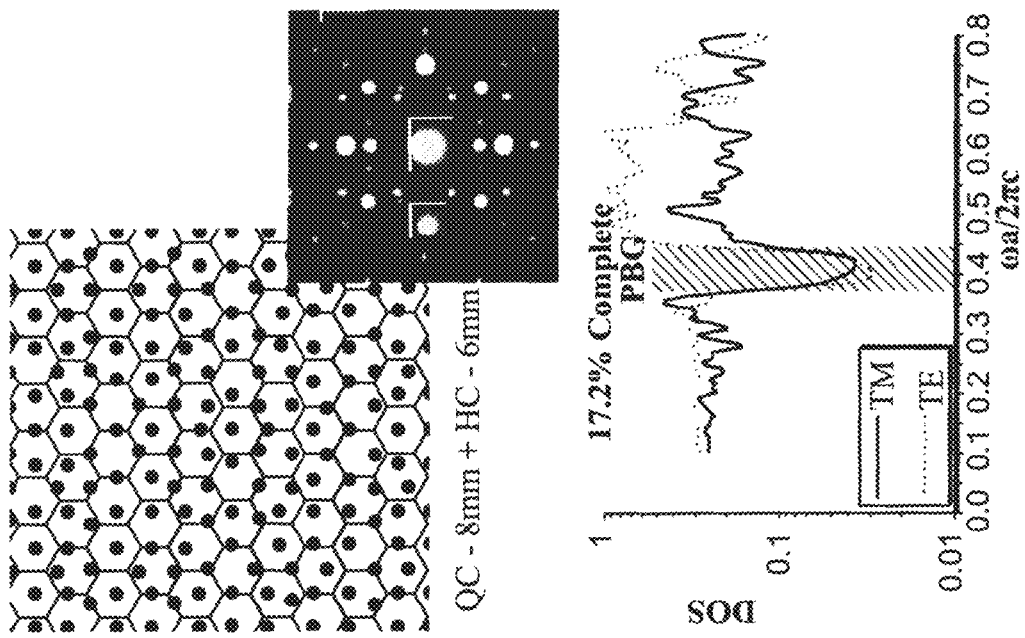
FIG. 6c is a schematic illustration of a 2-pattern photonic crystal from the QC-8mm plus HC-p6mm suc-structures with f(TE)=0.11 and f(TM)~0.14.
Figure 6F:
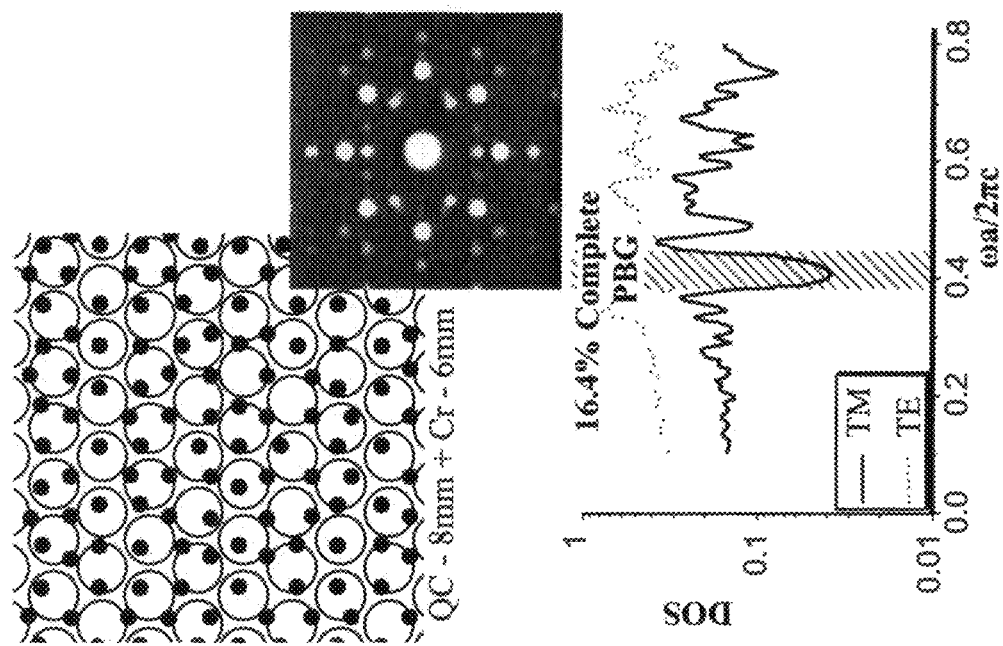
FIG. 6f is a schematic illustration of a 2-pattern photonic crystal from the QC-8mm plus CR-p6mm sub-structures with f(TE)=0.084 and f(TM)~0.14.
Figure 6E:
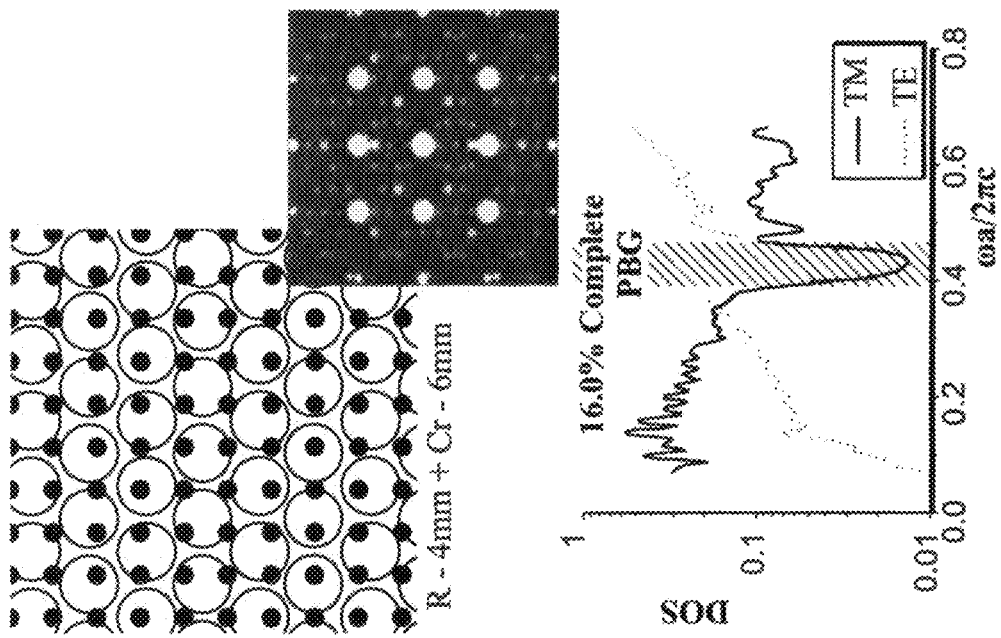
FIG. 6e is a schematic illustration of a 2-pattern photonic crystal from the R-p4mm plus CR-p6mm sub-structures with f(TE)=0.108, f(TM)=0.149 and a (TM)/a(TE)=0.6563.

Controlling electromagnetic waves at terahertz (THz) and gigahertz (GHz) frequencies is important and fabrication of 2-pattern photonic crystals at the associated length scales (microns and mm) is easy. Experimental techniques that can be used to fabricate "2-pattern photonic crystals" for the visible and near IR frequency regimes include nanoimprint lithography [32], electron beam lithography (EBL) [33], and focused ion beam lithography (FIBL). The 2-pattern photonic crystals are reasonably tolerant to possible experimental errors, including the variations of air gaps between dielectric regions. For example, for the structure shown in FIG. 6(a), we introduced a 40% random variation in the diameter of the rods ($r = r_0 + \Box r_0$, here $\Box r_0$ is a random value between $[0.4r_0, -0.4r_0]$) and 40% random variation in the thickness of the honeycomb walls ($h = h_0 + \Box h_0$, here $\Box h_0$ is a random value between $[0.4h_0, -0.4h_0]$), and the complete PBG is still large: 16%. Furthermore, we also introduced 30% random variation in the positions of rods ($\bar{r} = \bar{r}_0 + \Box \bar{r}_0$, here $|\Box \bar{r}_0|$ is a random value between $[0.3a(TM), -0.3a(TM)]$) and the complete PBG is 15%.

For the three selected TE sub-structures and the two TM sub-structures shown in FIG. 1, six 2-pattern photonic crystals can be constructed. For each combination, we maximize the complete PBG size by tuning the filling ratios and the relative scale of the sub-structures. The optimized structures with their discrete Fourier transforms (DFT) and the associated DOS calculations are shown in FIG. 6. The six optimized 2-pattern photonic crystals all have a complete PBG above 15% although as composite structures they do not possess any 2D symmetry. The aperiodic structure depicted in FIG. 6(a) has the best complete PBG (20.4%), which is highest reported complete PBG for 2D structures. Surprisingly, an aperiodic structure now becomes the champion PBG structure. The optimized structures generally have almost equal sub-structure filling ratios (around 0.1) and the length scales of the sub-structures need to be similar.

Figure 7A:
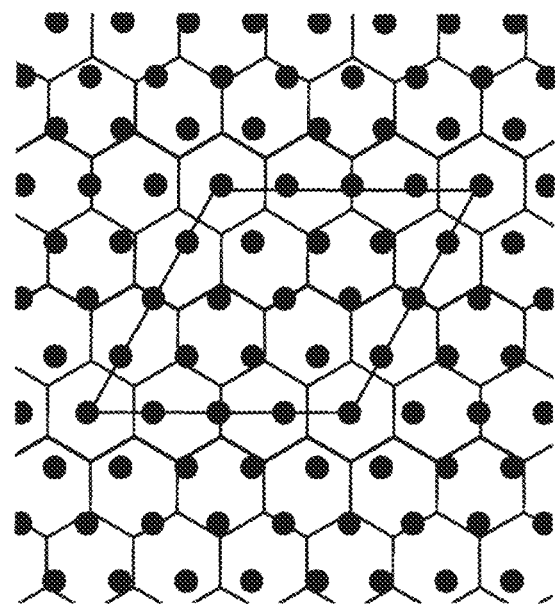
FIG. 7a is a schematic illustration of a periodic 2-pattern photonic crystal comprising honeycomb and rods of a triangular lattice.
Figure 7B:
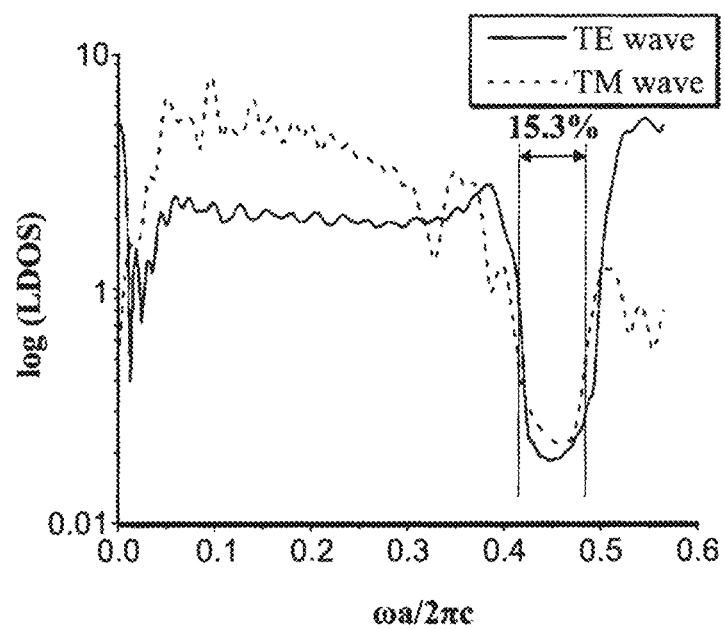
Figure 7C:
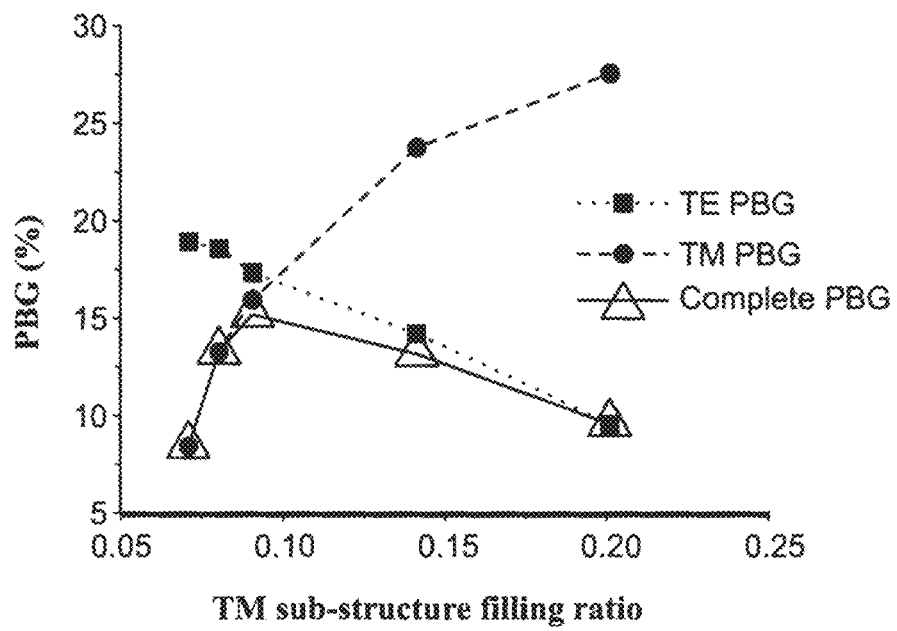
FIG. 7c is a graph showing the PBG properties of the 2-pattern structure as the TM sub-structure filling ratio is tuned while keeping the TE sub-structure filling ratio at 0.088.
Figure 7D:
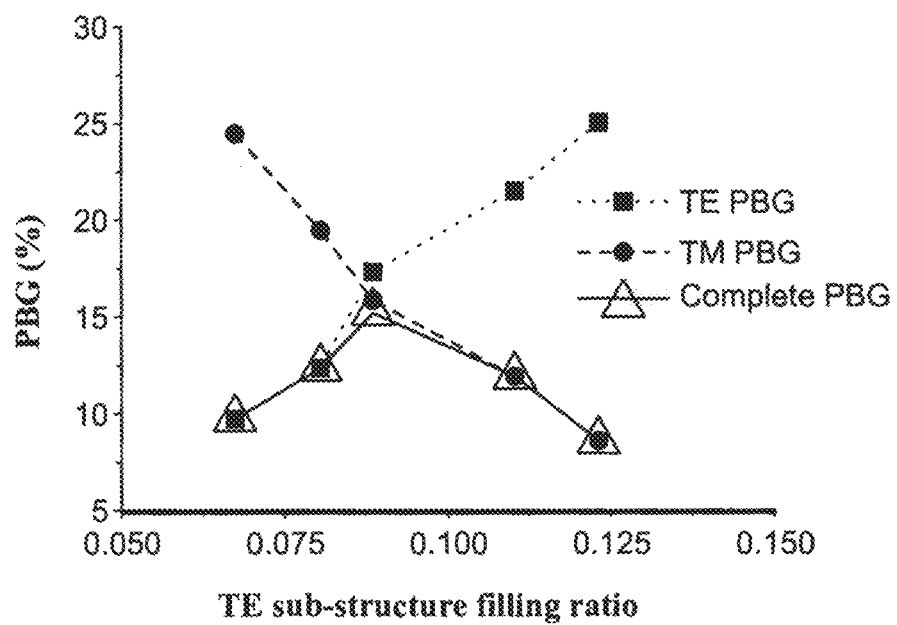
FIG. 7d is a graph showing the PBG properties of the 2-pattern structure as the TE sub-structure filling ratio is tuned while keeping the TM sub-structure filling ratio at 0.089.

In the above discussion, the 2-pattern photonic crystals are aperiodic, 2-pattern photonic crystal can also be periodic with a super unit cell. Periodic 2-pattern photonic crystal consists of two sub-structures superposing on the same plane with commensurate periodicity ratio. An exemplary periodic 2-pattern photonic crystal is shown in FIG. 7(a). Here a TM sub-structure comprises rods in a triangular lattice (R-6mm), and a TE sub-structure is a honeycomb network HC-6mm). The relative periodicity of the TM and TE sub-structures is a rational number: $a(TM)/a(TE) = m/n$. Here m and n are integers. The sub-structures are commensurate and form a super unit cell. Here we have tried many combinations of m and n. We find that $a(TM)/a(TE) = 3/4$ leads to the largest complete PBG. The optimized filling ratios are: 0.088 for TE sub-structure and 0.089 for TM sub-structure. The optimized commensurate 2-pattern photonic crystal and the associated PBG represented by local density of states (LDOS) are shown in FIGS. 7(a) and 7(b). The PBG properties of the optimized structure and the associated sub-crystals are shown in Table 1. The optimized 2-pattern photonic crystal has a complete PBG with 15.3% gap to mid-gap ratio. The PBG properties of 2-pattern photonic crystals with other filling ratios are shown in FIGS. 7(c) and 7(d).

TABLE 1 the PBG properties of the optimized 2-pattern photonic crystal and the associated sub-structures. The TM sub-structure consists of rods in a triangular lattice (R-6 mm) and the TE sub-structure is a honeycomb network (HC-6 mm).

|  | Filling ratio | TE PBG | TM PBG | Complete PBG |
|---|---|---|---|---|
| 2-Pattern photonic crystal | 0.178 | 17.4% | 16.0% | 15.3% |
| R-6 mm photonic crystal | 0.089 | none | 48.2% | None |
| HC-6 mm photonic crystal | 0.088 | 21.4% | none | none |

Figure 8A:
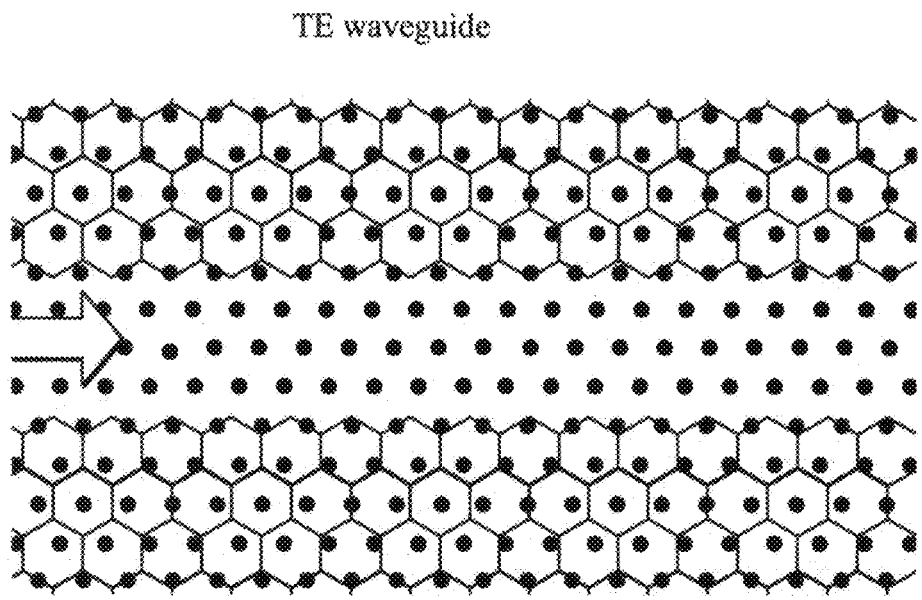
FIG. 8a is a schematic illustration of a TE waveguide.
Figure 8B:
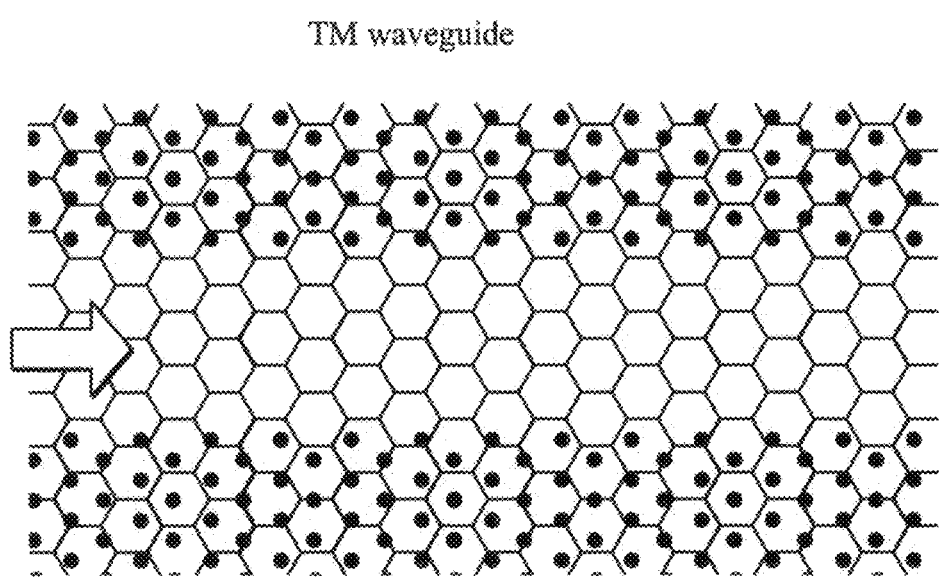
FIG. 8b is a schematic illustration of a TM waveguide.
Figure 8C:
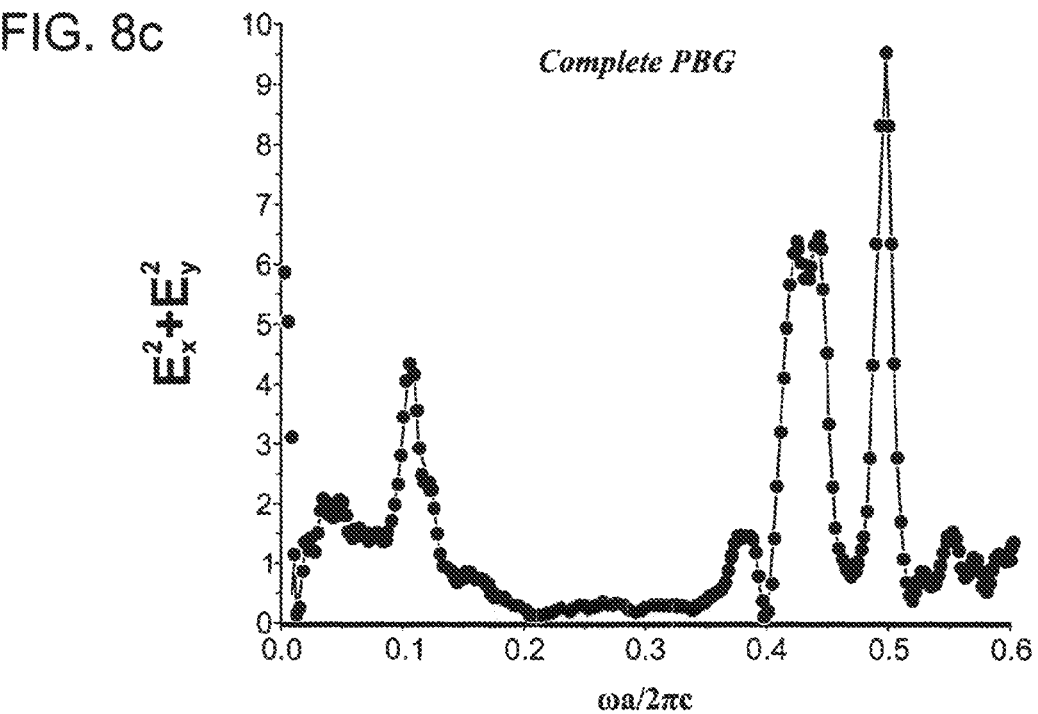
FIG. 8c is a graph showing optical wave transmission spectra for TE wave inside the TE waveguide.
Figure 8D:
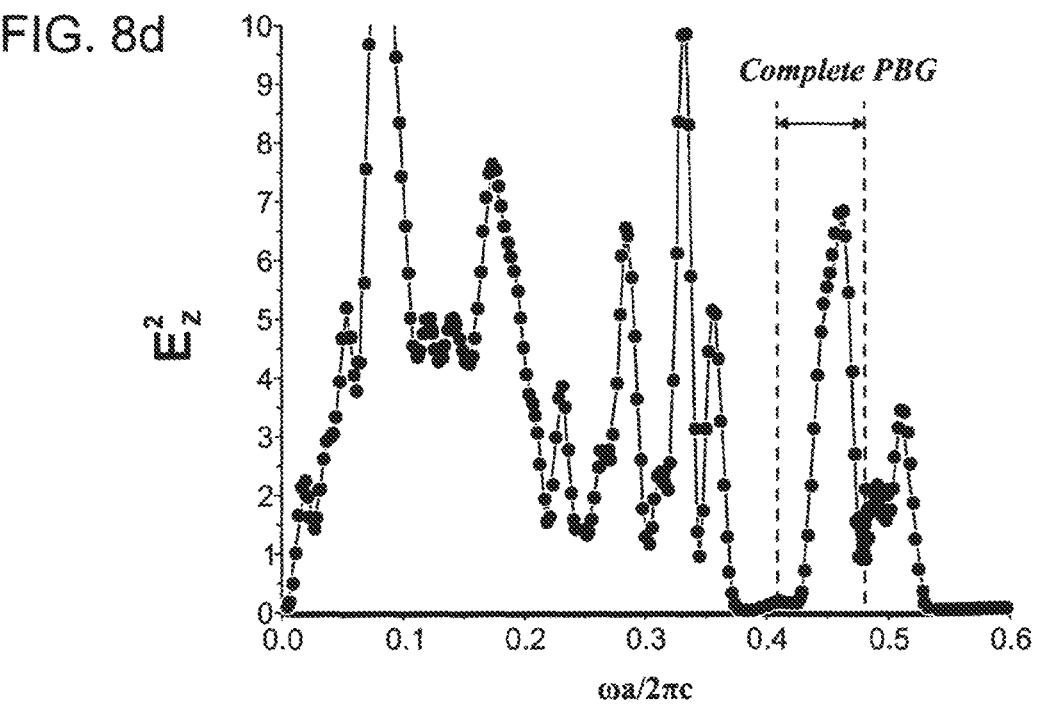
FIG. 8d is a graph showing the optical wave transmission spectra for TM wave inside the TM waveguide.
Figure 8E:
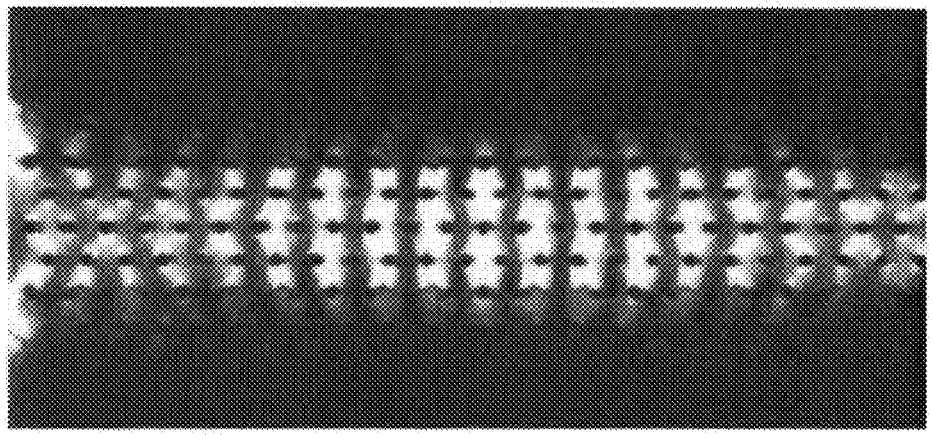
FIG. 8e is an illustration of a TE wave of working frequency propagating inside the TE waveguide.
Figure 8F:
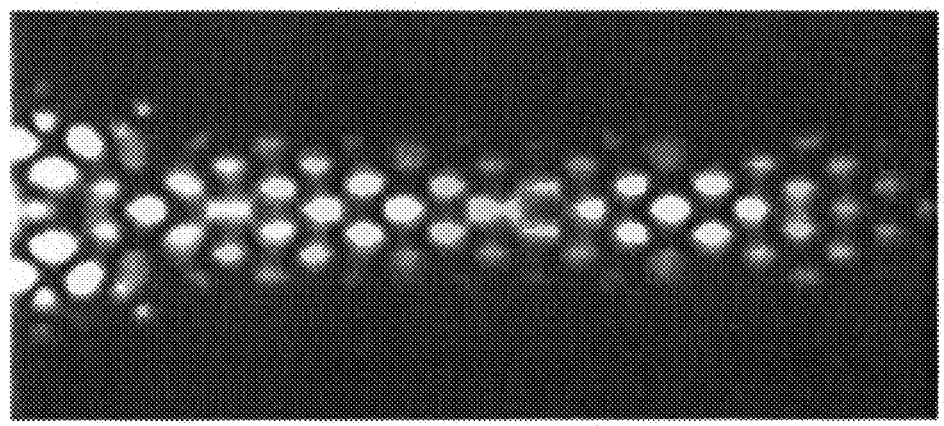
FIG. 8f is an illustration of a TM wave of working frequency propagating inside the TM waveguide.
Figure 9A:
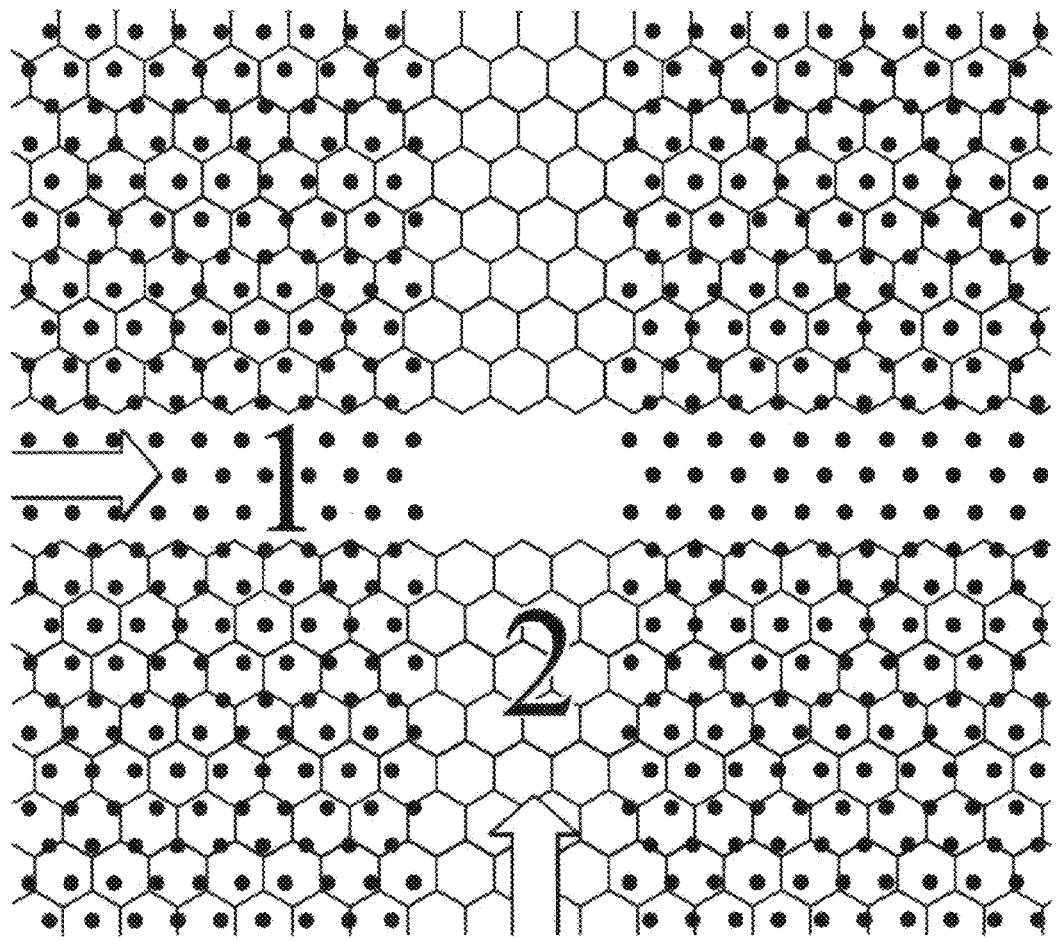
FIG. 9a is a schematic illustration of a crossed waveguide in which the transverse channel allows the propagation of TM waves and the vertical channel allows the propagation of TE waves.
Figure 10A:
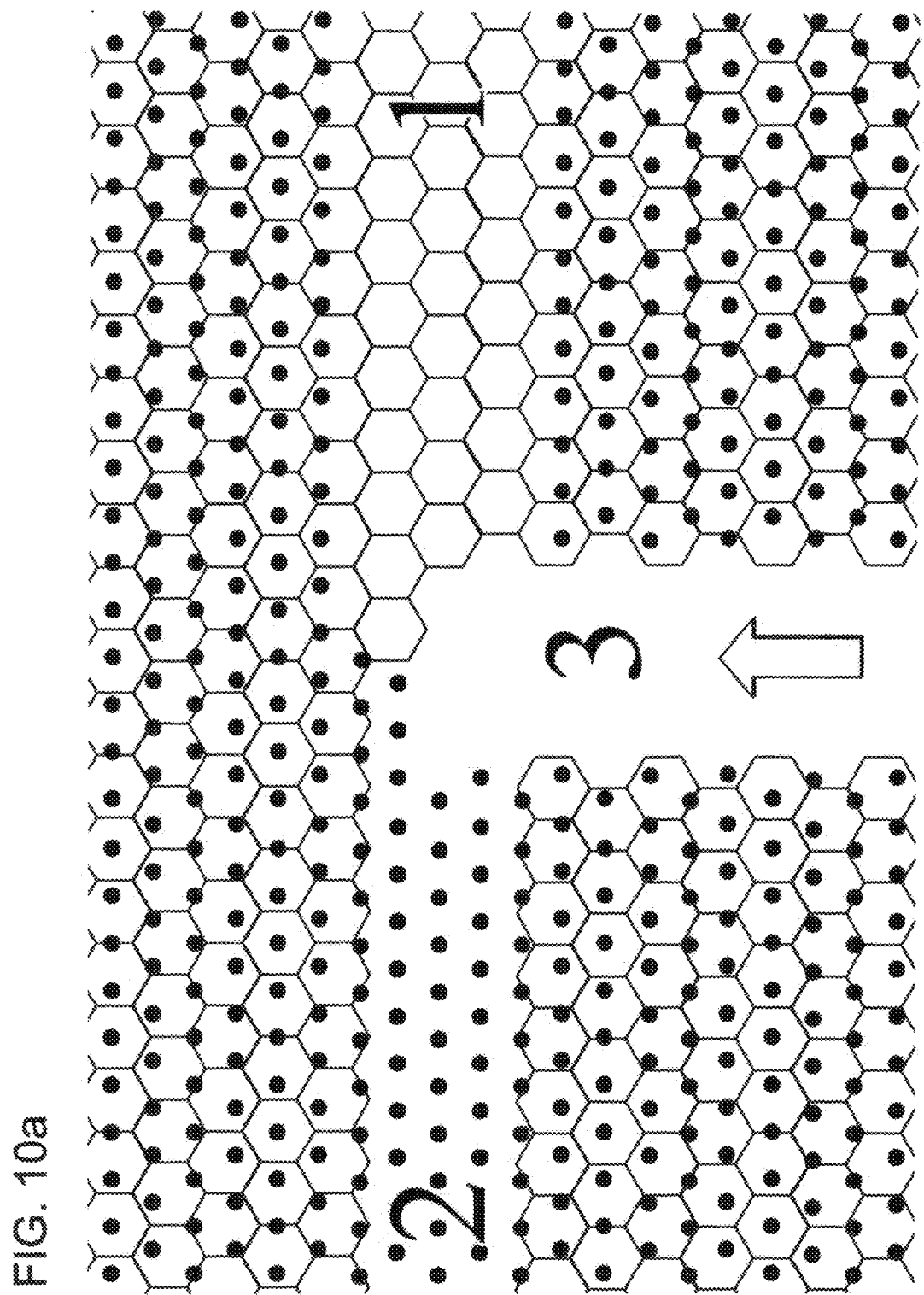
FIG. 10a is a schematic illustration of a wavelength-scale T-shape polarizer. Both TM wave and TE wave are introduced into region 3 and are separated into region 2 and region 1.

Because the TM/TE PBGs of the 2-pattern photonic crystals each arise from one of the two patterns, by purposely introducing defects into the sub-structures, novel types of photonic devices for different polarizations (TE, TM or both) can be readily designed. Four exemplary devices are given: polarization specific waveguides, crossed waveguide, T-shape polarizer, and a resonator for both polarizations. Two photonic crystal waveguides are shown in FIGS. 8(a) and 8(b). The waveguide in FIG. 8(a) is created by removing features of a TE substructure. It allows the propagation of a TE wave and stops the propagation of TM wave. The waveguide in FIG. 8(b) is created by removing features of TM sub-structure. It allows the propagation of a TM wave and it stops the propagation of TE wave. Compared to the polarization specific waveguides proposed before [47], the design here is much more intuitive. Further, the waveguides can be integrated to optical circuits which are shown in FIGS. 9(a) and 10(a). To analyze the wave-guiding properties of the waveguides, we send the electromagnetic (EM) wave which covers wide frequency range ($0 \leq \omega \leq 0.6 \times 2\pi c/a(TE)$) into one end of the waveguide and 100 detectors are located at the other end of the waveguide. The detectors collect the transmitted light intensity spectra, which are shown in FIG. 8(c) for the TE waveguide and FIG. 8(d) for the TM waveguide. The transmission peaks inside PBG demonstrate that waves which should be forbidden to propagate inside the 2-pattern photonic crystal are guided through the waveguide. A good working frequency for a waveguide should be near to the middle gap frequency and has a high transmissivity. According to FIGS. 8(c) and 8(d), frequency $\omega = 0.44 \times 2\pi c/a(TE)$ fulfils the above criterion for both TM and TE waveguides. To show the light intensity distribution of the guided waves, we introduce an EM wave of single frequency $\omega = 0.44 \times 2\pi c/a$ (TE) to the waveguide and calculated light intensity distribution. The light intensity distributions are shown in FIGS. 8(e) and 8(f).

Figure 9B:
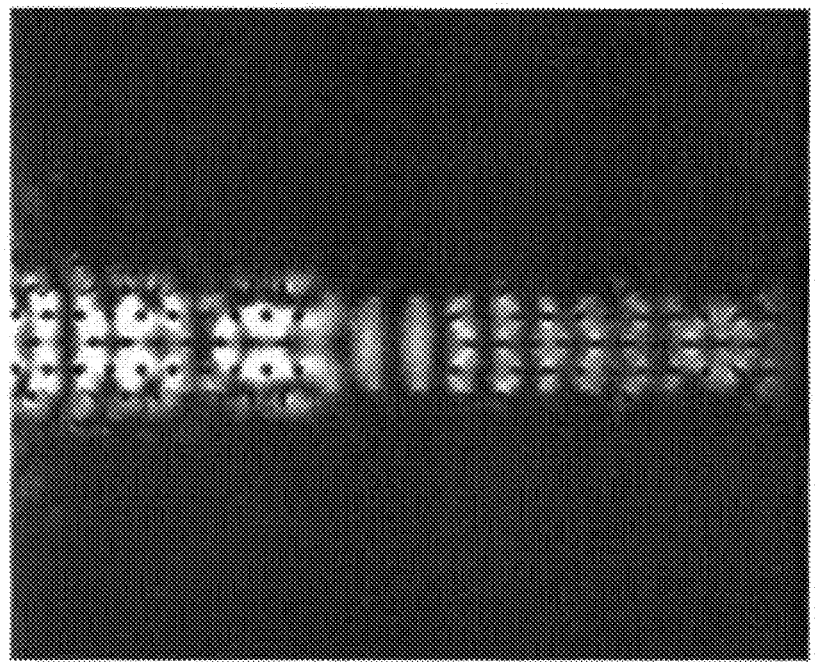
Figure 9C:
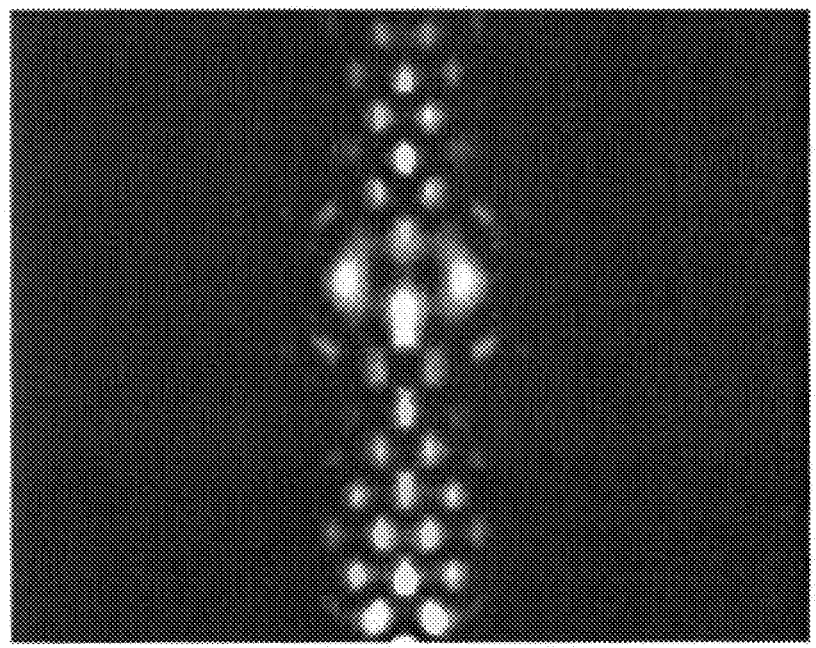
Figure 10B:
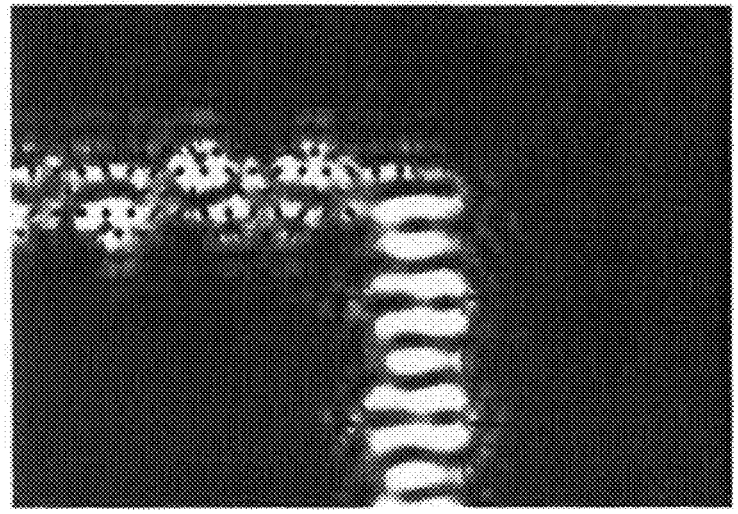
Figure 10C:
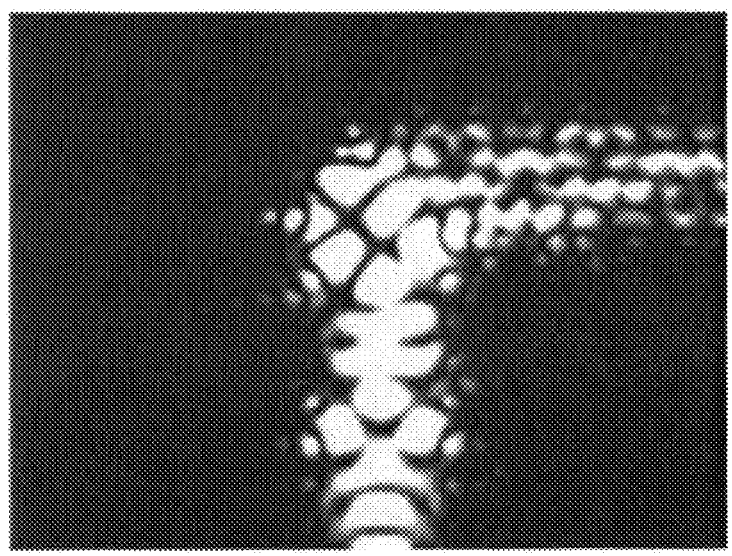

The 2-pattern photonic crystal also offers a platform to integrate the polarization specific waveguides to optical circuits. For example, a crossed waveguide is shown in FIG. 9(a). Such a fundamental optical device has potential to be a basic component in an optical communication and optical network. To illustrate how one can retain mode polarization through the crossing point, we introduce TE waves into region 1 and TM waves into in region 2. The light intensity distributions for TE and TM waves are shown in FIGS. 9(b) and 9(c), which demonstrate that the cross talk is trivial. Another example device is a T-shaped polarizer in FIG. 10(a). Here region 3 allows the propagation of both TE and TM waves; region 2 allows the propagation of TE waves while blocking TM waves; region 1 allows the propagation of TM waves while blocking TE waves. The light intensity distributions of TE and TM waves are shown in FIGS. 10(b) and 10(c).

Figure 11A:
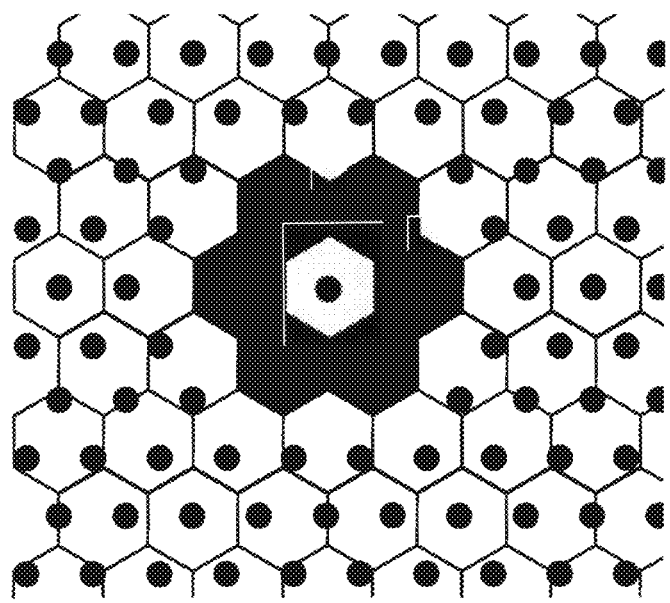
FIG. 11a is a schematic illustration of a resonator for both TM and TE waves.
Figure 11B:
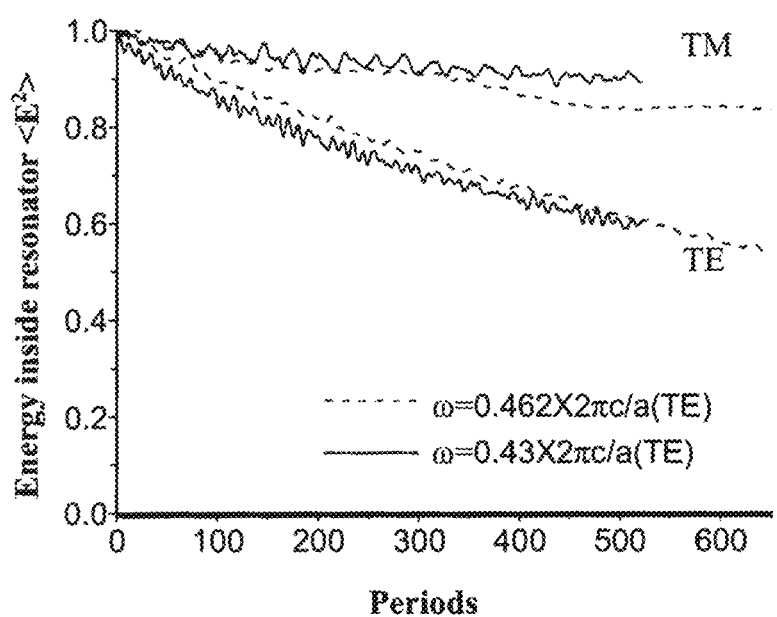
FIG. 11b is a graph showing energy dissipation for the two resonance peaks. The upper lines are for TM waves and lower lines are for TE waves.

By creating defects in both patterns, we can create a cavity which resonates for both TM and TE waves at the same frequency, which is shown in FIG. 11(a). To find out the working frequency of the cavity, we send an optical wave covering a wide frequency into the cavity and pursue Fourier analysis to calculate the wave spectra for both TM and TE waves. $\omega = 0.43 \times 2\pi c/a(TE)$ and $\omega = 0.462 \times 2\pi c/a(TE)$ are premier working frequencies of the cavity for both TM and TE wave. To calculate the quality factor, we introduce light of the resonance frequency into the resonator and record the energy dissipation after the light source is terminated. The results for TM and TE waves for the two resonance frequencies are shown in FIG. 11(b). At $\omega = 0.462 \times 2\pi c/a(TE)$, the quality factors are 6.47k and 21.4k for TE and TM waves respectively; at $\omega = 0.43 \times 2\pi c/a(TE)$, the quality factors are 6.46k and 29.7k for TE and TM waves respectively.

In summary, a novel set of PBG structures named "2-pattern photonic crystals" consisting of two sub-structures are described here. They exhibit large, complete PBGs, and they open a wide range of future opportunities. Firstly, a rich variety of different 2-pattern photonic crystals can be developed using the large inventory of existing photonic crystals with sizeable TM or TE gaps. We anticipate that our method will become a useful tool to design photonic crystals with large, complete PBGs, which is essential for the associated photonic devices. Secondly, we demonstrate that the TE and TM PBGs of a 2-pattern photonic crystal can be tuned much more independently than conventional photonic crystals. By introducing defects into the sub-structures, photonic devices for TM/TE polarizations can be realized to achieve functionality not possible or highly challenging for conventional photonic crystal devices. Lastly, we demonstrate the intuitive, generalizable design process of several interesting optical devices. Given the diverse set of other sub-structures and various photonic crystal device designs, more integrated optical devices based on 2-pattern photonic crystals are expected to be designed in the near future.

The contents of all of the references appended hereto are incorporated herein by reference.

REFERENCES

1. L. Jia, and E. L. Thomas, "Two-pattern compound photonic crystals with a large complete photonic band gap," Physical Review A 84, 033810 (2011).
2. L. Jia, and E. L. Thomas, "Theoretical study on photonic devices based on a commensurate two-pattern photonic crystal," Optics Letters 36, 3416-3418 (2011).
3. Y. Akahane, T. Asano, B. S. Song, and S. Noda, "High-Q photonic nanocavity in a two-dimensional photonic crystal," Nature 425, 944-947 (2003).
4. S. Noda, M. Fujita, and T. Asano, "Spontaneous-emission control by photonic crystals and nanocavities," Nature Photonics 1, 449-458 (2007).
5. Y. A. Vlasov, M. O'Boyle, H. F, Hamann, and S. J. McNab, "Active control of slow light on a chip with photonic crystal waveguides," Nature 438, 65-69 (2005).
6. M. Belotti, J. F. Galisteo-Lopez, S. De Angelis, M. Galii, I. Maksymov, L. C. Andreani, D. Peyrade, and Y. Chen, "All-optical switching in 2D silicon photonic crystals with low loss waveguides and optical cavities," Optics Express 16, 11624-11636 (2008).
7. R. S. Jacobsen, K. N. Andersen, P. I. Borel, J. Fage-Pedersen, L. H. Frandsen, O. Hansen, M. Kristensen, A. V. Lavrinenko, G. Moulin, H. Ou, C. Peucheret, B. Zsigri, and A. Bjarklev, "Strained silicon as a new electro-optic material," Nature 441, 199-202 (2006).
8. D. Englund, D. Fattal, E. Waks, G. Solomon, B. Zhang, T. Nakaoka, Y. Arakawa, Y. Yamamoto, and J. Vuckovic, "Controlling the spontaneous emission rate of single quantum dots in a two-dimensional photonic crystal," Physical Review Letters 95 (2005).
9. M. Fujita, S. Takahashi, Y. Tanaka, T. Asano, and S. Noda, "Simultaneous inhibition and redistribution of spontaneous light emission in photonic crystals," Science 308, 1296-1298 (2005).
10. Y. Tanaka, J. Upham, T. Nagashima, T. Sugiya, T. Asano, and S. Noda, "Dynamic control of the Q factor in a photonic crystal nanocavity," Nature Materials 6, 862-865 (2007).
11. J. S. Foresi, P. R. Villeneuve, J. Ferrera, E. R. Thoen, G. Steinmeyer, S. Fan, J. D. Joannopoulos, L. C. Kimerling, H. I. Smith, and E. P. Ippen, "Photonic-bandgap microcavities in optical waveguides," Nature 390, 143-145 (1997).
12. E. Chow, S. Y. Lin, S. G. Johnson, P. R. Viileneuve, J. D. Joannopoulos, J. R. Wendt, G. A. Vawter, W. Zubrzycki, H. Hon, and A. Alleman, "Three-dimensional control of light in a two-dimensional photonic crystal slab," Nature 407, 983-986 (2000).
13. T. F. Krauss, R. M. DeLaRue, and S. Brand, "Two-dimensional photonic-bandgap structures operating at near infrared wavelengths," Nature 383, 699-702 (1996).

14. Y. Tanaka, T. Asano, Y. Akahane, B. S. Song, and S. Noda, "Theoretical investigation of a two-dimensional photonic crystal slab with truncated cone air holes," Applied Physics Letters 82, 1661-1663 (2003).
15. H. Matsubara, S. Yoshimoto, H. Saito, J. L. Yue, Y. Tanaka, and S. Noda, "GaN photonic-crystal surface-emitting laser at blue-violet wavelengths," Science 319, 445-447 (2008).
16. O. Painter, R. K. Lee, A. Scherer, A. Yariv, J. D. O'Brien, P. D. Dapkus, and I. Kim, "Two-dimensional photonic band-gap defect mode laser," Science 284, 1819-1821 (1999).
17. H. G. Park, S. H. Kim, S. H. Kwon, Y. G. Ju, J. K. Yang, J. H. Back, S. B. Kim, and Y. H. Lee, "Electrically driven single-cell photonic crystal laser," Science, 305, 1444-1447 (2004).
18. K. Ishihara, M. Fujita, I. Matsubara, T. Asano, S. Noda, H. Ohata, A. Hirasawa, H. Nakada, and N. Shimoji, "Organic light-emitting diodes with photonic crystals on glass substrate fabricated by nanoimprint lithography," Applied Physics Letters 90 (2007).
19. M. Fujita, T. Ueno, K. Ishihara, T. Asano, S. Noda, H. Ohata, T. Tsuji, H. Nakada, and N. Shimoji, "Reduction of operating voltage in organic light-emitting diode by corrugated photonic crystal structure," Applied Physics Letters 85, 5769-5771 (2004).
20. M. Fujita, T. Ueno, T. Asano, S. Noda, H. Ohhata, T. Tsuji, H. Nakada, and N. Shimoji, "Organic light-emitting diode with ITO/organic photonic crystal, " Electronics Letters 39, 1750-1752 (2003).
21. M. Fujita, K. Ishahara, T. Ueno, T. Asano, S. Noda, H. Ohata, T. Tsuji, H. Nakada, and N. Shimoji, "Optical and electrical characteristics of organic light-emitting diodes with two-dimensional photonic crystals in organic/electrode layers," Japanese Journal of Applied Physics Part 1-Regular Papers Short Notes & Review Papers 44, 3669-3677 (2005).
22. A. Chutinan, K. Ishihara, T. Asano, M. Fujita, and S. Noda, "Theoretical analysis on light-extraction efficiency of organic light-emitting diodes using FDTD and mode-expansion methods," Organic Electronics 6, 3-9 (2005).
23. S. Noda, A. Chutinan, and M. Imada, "Trapping and emission of photons by a single defect in a photonic band-gap structure," Nature 407, 608-610 (2000).
24. J. Limpert, A. Liem, M. Reich, T. Schreiber, S. Nolte, H. Zellmer, A. Tunnermann, J. Broeng, A. Petersson, and C. Jakobsen, "Low-nonlinearity single-transverse-mode ytterbium-doped photonic crystal fiber amplifier," Optics Express 12, 1313-1319 (2004).
25. T. T. Larsen, A. Bjarklev, D. S. Hermann, and J. Broeng, "Optical devices based on liquid crystal photonic bandgap fibres," Optics Express 11, 2589-2596 (2003).
26. L. Jia, I. Bita, and E. L. Thomas, "Impact of Geometry on the TM Photonic Band Gaps of Photonic Crystals and Quasicrystals," Physical Review Letters 107 (2011).
27. L. Jia, I. Bita, and E. L. Thomas, "Photonic density of states of two-dimensional quasicrystalline photonic structures," Physical Review A 84 (2011).
28. M. C. Rechtsman, H. C. Jeong, P. M. Chaikin, S. Torquato, and P. J. Steinhardt, "Optimized structures for photonic quasicrystals," Physical Review Letters 101 (2008).
29. O. Sigmund, and K. Hougaard, "Geometric properties of optimal photonic crystals," Physical Review Letters 100 (2008).
30. J. D. Joannopoulos, S. G. Johnson, J. N. Winn, and R. D. Meade, *Photonic crystals: molding the flow of light* (Princeton University Press, Princeton, 2008).
31. M. Florescu, S. Torquato, and P. J. Steinhardt, "Designer disordered materials with large, complete photonic band gaps," Proceedings of the National Academy of Sciences of the United States of America 106, 20658-20663 (2009).
32. S. Y. Chou, P. R. Krauss, and P. J. Renstrom, "Nanoimprint lithography," Journal of Vacuum Science & Technology B 14, 4129-4133 (1996).
33. Y. N. Xia, J. A. Rogers, K. E. Paul, and G. M. Whitesides, "Unconventional methods for fabricating and patterning nanostructures," Chemical Reviews 99, 1823-1848 (1999).

What is claimed is:

1. 2-pattern photonic crystal comprising: a TM sub-structure providing a large TM photonic band gap superimposed on the same plane at the scale of an optical wave wavelength on a TE sub-structure providing a large TE photonic band gap.

2. The photonic crystal devices based on tuning features of sub-structures of 2-pattern photonic crystals of claim 1.

3. The photonic crystal of claim 1 wherein the TM sub-structure consists of discrete dielectric features.

4. The photonic crystal of claim 1 wherein the TE sub-structure consists of expanded dielectric features.

5. The photonic crystal of claim 1 wherein the sub-structures are periodic or aperiodic.

6. The photonic crystal of claim 1 wherein the TM polarization sub-structure has a small TE photonic band gap and the TE polarization sub-structure has a small TM photonic band gap.

7. The photonic crystal of claim 1 wherein the TM sub-structure comprises rods on a triangular lattice.

8. The photonic crystal of claim 1 wherein the TM sub-structure comprises rods on a square lattice.

9. The photonic crystal of claim 1 wherein the TM sub-structure comprises an eight-fold quasicrystal of discrete rods.

10. The photonic crystal of claim 1 wherein the TE sub-structure is a connected honeycomb structure.

11. The photonic crystal of claim 1 wherein the TE sub-structure comprises circular rings on a triangular lattice.

12. The photonic crystal of claim 1 wherein the sub-structures comprise GaAs.

13. The photonic crystal of claim 1 wherein the sub-structures comprise silicon.

14. The photonic crystal of claim 1 wherein the relative length scale of the sub-structures is tuned so that the TE-photonic band gap and the TM photonic hand gap fully overlap.

15. The photonic crystal of claim 1 wherein filling ratios of the sub-structures are selected to maximize the complete photonic band gap.

16. The photonic crystal device of claim 2 wherein features are removed from the TE sub-structure without modifying the TM sub-structure to create a waveguide for propagating TE waves and stopping propagation of TM waves.

17. The photonic crystal device of claim 2 wherein features are removed from the TM sub-structure without modifying the TE sub-structure to create a waveguide for propagating TM waves and stopping propagation of TE waves.

18. The photonic crystal device of claim 2 forming a crossed waveguide.

19. The photonic crystal device of claim 2 forming is T-shaped polarizer.

20. The photonic crystal device of claim 2 forming a high-Q resonator.

* * * * *